(12) United States Patent
Kraus et al.

(10) Patent No.: US 11,704,431 B2
(45) Date of Patent: Jul. 18, 2023

(54) DATA SECURITY CLASSIFICATION SAMPLING AND LABELING

(71) Applicant: Microsoft Technology Licensing, LLC, Redmond, WA (US)

(72) Inventors: Naama Kraus, Haifa (IL); Tamer Salman, Haifa (IL); Salam Bashir, Sakhnin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 16/424,539

(22) Filed: May 29, 2019

(65) Prior Publication Data

US 2020/0380160 A1  Dec. 3, 2020

(51) Int. Cl.
*G06F 21/62* (2013.01)

(52) U.S. Cl.
CPC ................................ *G06F 21/6245* (2013.01)

(58) Field of Classification Search
CPC ........................... G06F 21/577; G06F 21/6245
USPC ............................................................. 726/26
See application file for complete search history.

(56) References Cited

U.S. PATENT DOCUMENTS

| | | | | |
|---|---|---|---|---|
| 8,701,190 B1* | 4/2014 | Chau | ........................ | G06F 21/56 726/23 |
| 8,819,024 B1* | 8/2014 | Toderici | .................. | G06V 20/41 707/754 |
| 9,367,814 B1* | 6/2016 | Lewis | .................... | G06F 16/353 |
| 2004/0128615 A1 | 7/2004 | Carmel et al. | | |
| 2004/0167897 A1* | 8/2004 | Kuhlmann | .......... | G06F 16/2465 |
| 2007/0027873 A1 | 2/2007 | Factor et al. | | |
| 2007/0265999 A1 | 11/2007 | Amitay et al. | | |
| 2008/0082352 A1* | 4/2008 | Schmidtler | ............ | G06Q 10/10 705/2 |

(Continued)

FOREIGN PATENT DOCUMENTS

| | | |
|---|---|---|
| KR | 20160141457 A | 12/2016 |
| WO | 2015183698 A1 | 12/2015 |

OTHER PUBLICATIONS

NPL Search Terms (Year: 2020).*

(Continued)

*Primary Examiner* — Syed A Zaidi
(74) *Attorney, Agent, or Firm* — Ogilvie Law Firm

(57) ABSTRACT

Cybersecurity and data categorization efficiency are enhanced by providing reliable statistics about the number and location of sensitive data of different categories in a specified environment. These data sensitivity statistics are computed while iteratively sampling a collection of blobs, files, or other stored items that hold data. The items may be divided into groups, e.g., containers or directories. Efficient sampling algorithms are described. Data sensitivity statistic gathering or updating based on the sampling activity ends when a specified threshold has been reached, e.g., a certain number of items have been sampled, a certain amount of data has been sampled, sampling has used a certain amount of computational resources, or the sensitivity statistics have stabilized to a certain extent. The resulting statistics about data sensitivity can be utilized for regulatory compliance, policy formulation or enforcement, data protection, forensic investigation, risk management, evidence production, or another classification-dependent or classification-enhanced activity.

20 Claims, 6 Drawing Sheets

SOME SAMPLING CONTROL CONDITIONS 408

ITERATIONS-COMPLETE-CONDITION 502

SCANNING-CONDITION 504

SAMPLING ALLOTMENT BASIS 506:
TIME AMOUNT 508,
COMPUTATIONAL RESOURCE AMOUNT 510,
POWER CONSUMPTION AMOUNT 512,
NUMBER OF STORED ITEMS 514,
AMOUNT OF STORED ITEM DATA 516

(56) References Cited

U.S. PATENT DOCUMENTS

| | | |
|---|---|---|
| 2009/0319484 A1 | 12/2009 | Golbandi et al. |
| 2011/0119210 A1* | 5/2011 | Zhang .................... G06N 20/00 706/12 |
| 2011/0131202 A1 | 6/2011 | Cohen et al. |
| 2011/0229025 A1* | 9/2011 | Zhao .................... G06V 10/462 382/165 |
| 2013/0124576 A1 | 5/2013 | Adir et al. |
| 2013/0196305 A1 | 8/2013 | Adir et al. |
| 2014/0201208 A1* | 7/2014 | Satish .................... G06F 21/564 707/737 |
| 2014/0214396 A1 | 7/2014 | Adir et al. |
| 2014/0237450 A1 | 8/2014 | Levy et al. |
| 2015/0046138 A1 | 2/2015 | Adir et al. |
| 2016/0246705 A1 | 8/2016 | Bitar et al. |
| 2017/0103012 A1 | 4/2017 | Bitar et al. |
| 2017/0103099 A1 | 4/2017 | Bitar et al. |
| 2017/0109255 A1 | 4/2017 | Adir et al. |
| 2017/0109515 A1 | 4/2017 | Aharoni et al. |
| 2017/0124324 A1 | 5/2017 | Peleg et al. |
| 2017/0193375 A1 | 7/2017 | Bitar et al. |
| 2018/0137303 A1 | 5/2018 | Farkash et al. |
| 2018/0158061 A1 | 6/2018 | Edelstein et al. |
| 2018/0197087 A1* | 7/2018 | Luo ........................ G06N 20/00 |
| 2018/0232518 A1 | 8/2018 | Copty et al. |
| 2018/0232523 A1 | 8/2018 | Copty et al. |

OTHER PUBLICATIONS

NPL Search Terms (Year: 2023).*

"Data classification (data management)", retrieved from <<https://en.wikipedia.org/wiki/Data_classification_ (data_management)>>, Mar. 28, 2019, 5 pages.

"International Search Report and Written Opinion Issued in PCT Application No. PCT/US20/026034", dated May 29, 2020, 11 Pages.

* cited by examiner

| SOME EXAMPLES OF SENSITIVE DATA 212 | |
|---|---|
| HEALTH INFORMATION 902 | BIOMETRIC DATA 914 |
| FINANCIAL INFORMATION 904 | GENETIC DATA 916 |
| RACIAL OR ETHNIC DATA 906 | RELIGIOUS DATA 918 |
| IDENTITY DATA 908 | POLITICAL DATA 920 |
| SEXUAL DATA 910 | MARITAL DATA 922 |
| TRADE SECRET DATA 912 | FAMILY DATA 924 |
| CONFIDENTIAL COMMERCIAL INFORMATION 926 | |

DATA SECURITY CLASSIFICATION SAMPLING AND LABELING

BACKGROUND

A major goal of information assurance is to provide confidence that information systems will perform as desired, and that information will be available only to authorized users. Cybersecurity is viewed by some people as a specialization within the realm of information assurance, while other people take a broader view of cybersecurity and may even consider cybersecurity and information assurance to be essentially the same as one another. A broad view, which treats "information assurance" and "cybersecurity" as interchangeable, applies in this document.

Regardless of the terminology used, however, various classifications of data may be employed to help make data available, to keep data confidential, and to maintain the integrity of data. In the present document, "data classification", "data security classification", and "data categorization" all mean the same thing, as opposed to other contexts in which "classification" more narrowly means an official action taken by a government or a military to restrict access to data based on national security concerns, or a result of such official action.

Data classification activities recognize that data in one category can, or should, or in some cases must, be treated differently and protected differently from data in another category, according to the respective categorizations. Many laws, regulations, guidelines, standards, and policies define different categories of data, and describe category-dependent criteria for protecting or using data. Some of the many examples include the General Data Protection Regulation (GDPR) in Europe and several jurisdictions outside Europe, the Health Insurance Portability and Accountability Act (HIPAA) in the United States, the Personal Information Security Specification in the People's Republic of China, and a wide variety of corporate or institutional policies worldwide.

SUMMARY

Some embodiments taught herein use or perform operations that enhance cybersecurity and data categorization efficiency by providing reliable statistics about the number and location of sensitive data of different categories. These data sensitivity statistics are computed while iteratively sampling a collection of items that hold data. Efficient sampling algorithms are described. Data sensitivity statistic gathering or updating that is based on the sampling activity ends when a specified threshold has been reached, e.g., a certain number of items have been sampled, a certain amount of data has been sampled, sampling has used a certain amount of power or CPU cycles or another computational resource, or the sensitivity statistics have stabilized to a certain extent. The resulting statistics about data sensitivity can be utilized for regulatory compliance, policy formulation or enforcement, data protection, forensic investigation, risk management, evidence production, or another classification-dependent or classification-enhanced activity.

Some embodiments repeat iterations of a data sampling sequence until an iterations-complete-condition is met. The data sampling sequence of a current iteration includes: selecting a current iteration scan-set of stored items from a group of stored items, the selecting based at least partially on a current iteration sampling allotment; when a scanning-condition is met then in response scanning data of the current iteration scan-set for sensitive data which meets a predefined sensitivity criterion which defines a sensitivity type; when scanned data of a particular stored item of the current iteration scan-set includes sensitive data which meets the predefined sensitivity criterion, then in response updating a data security classification statistical measure; calculating a next iteration sampling allotment which is based at least partially on the current iteration sampling allotment and the data security classification statistical measure; and when the iterations-complete-condition is not met, then in response using the next iteration sampling allotment as the current iteration sampling allotment of a next iteration of the data sampling sequence.

Some embodiments of teachings presented herein include or communicate with data security classification sampling functionality that includes digital hardware that is configured to perform certain operations. These operations may provide data security classification statistics by (a) getting an iterations-complete-condition, and (b) iteratively repeating a data sampling sequence until the iterations-complete-condition is met, wherein the data sampling sequence of a current iteration includes (b1) selecting a current iteration scan-set of stored items from a group of stored items, the selecting based at least partially on a current iteration sampling allotment, (b2) when a scanning-condition is met then in response scanning data of the current iteration scan-set for sensitive data which meets a predefined sensitivity criterion which defines a sensitivity type, (b3) when scanned data of a particular stored item of the current iteration scan-set includes sensitive data which meets the predefined sensitivity criterion, then in response labeling the particular stored item with a predefined sensitivity label which corresponds to the predefined sensitivity criterion, and when the scanned data of a particular stored item does not include data which meets the predefined sensitivity criterion, then in response avoiding labeling the particular stored item with the predefined sensitivity label, (b4) updating a data security classification statistical measure in response to the labeling or the avoiding labeling, (b5) calculating a next iteration sampling allotment which is based at least partially on the current iteration sampling allotment and the data security classification statistical measure, and (b6) when the iterations-complete-condition is not met, then in response using the next iteration sampling allotment as the current iteration sampling allotment of a next iteration of the data sampling sequence.

Some embodiments can provide a data sensitivity result which is suitable for beneficial use by at least one of the following: a data privacy tool, a data security tool, a data loss prevention tool, a risk management tool, a regulatory compliance tool, a forensics tool, a computational resource administration tool, or a litigation evidence production tool. The data sensitivity result includes at least one data sensitivity statistic based on the sampling. The data sensitivity result optionally includes sampling metadata such as time expended, resources used, items scanned, items labeled, or the like, which are not necessarily part of the iterations-complete-condition.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
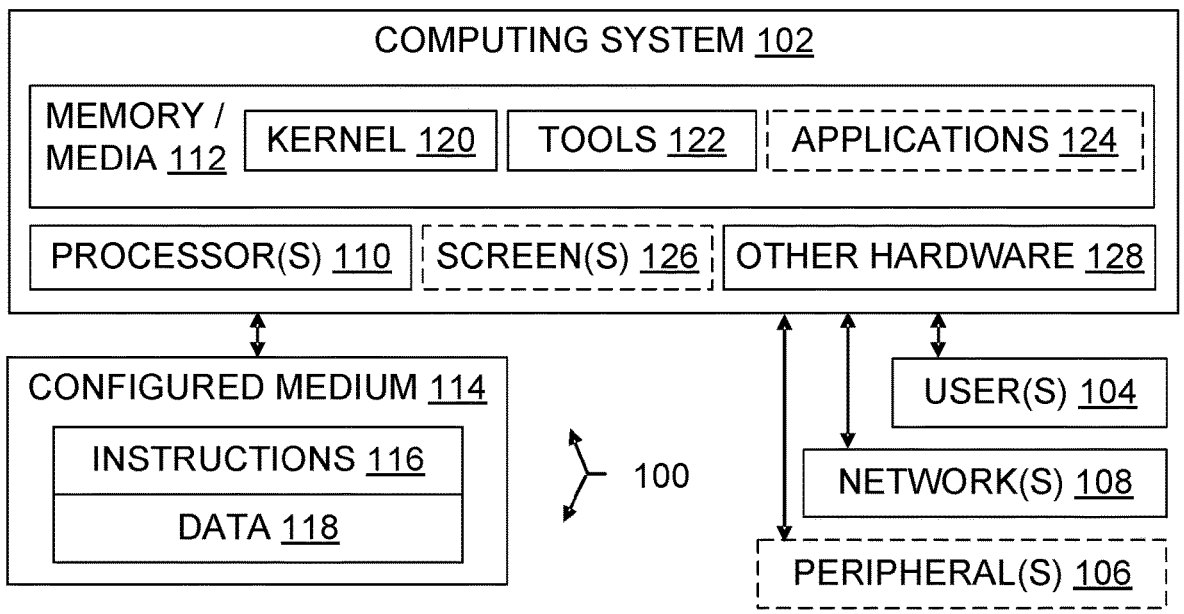
FIG. 1 is a block diagram illustrating computer systems generally and also illustrating configured storage media generally.

Many innovations expand beyond their origins, but understanding an innovation's origins can help one more fully appreciate the innovation. In the present case, some teachings described herein were motivated by technical challenges of categorizing large enterprise data efficiently in a cloud, as part of technology that may become part of Microsoft Azure® storage security solutions (mark of Microsoft Corporation). However, the teachings presented herein are not necessarily limited to clouds, or to large enterprises, or to environments that use solutions from any particular vendor. Teachings herein that promote efficient and effective sampling for data classification can be benefically applied outside clouds as well as within them, by data owners, data controllers, data processors, and other entities of any size, with software from many different sources.

By way of context, organizations today maintain huge volumes of data which includes sensitive information such as credit card numbers, bank account information, identifications, encryption keys, secrets, and so on. Protecting sensitive data is of top importance to many organizations, due to security and privacy regulations. Reliable metadata about sensitive information has value in the administration of privacy and security locally, regionally, and worldwide.

Organizations may benefit from knowing where their sensitive information resides and what categories it lies in, for multiple reasons. As to regulatory compliance, for example, certain kinds of sensitive information are legally required to have certain security and privacy controls, or at least certain levels of control. As to organizational policy, many organizations have mandatory policies regarding treatment of sensitive information, such as permissions, encryption, auditing, and so on. As to alert severity, knowing where sensitive information resides and why it is sensitive plays a major role in prioritizing alerts in an organization. If a server, router, other network device, service, or other computational resource has sensitive information or if access to sensitive information is compromised, then incident response teams give the alert significantly higher priority than an alert about a resource that has no access to any sensitive information. As to harm prevention and containment, security controls on sensitive information are (or generally should be) applied more strictly than controls on less sensitive or non-sensitive data. As to forensics, when a breach is analyzed, knowing the sensitivity type of data that was exposed may define the bottom line impact of the attack. Cyberattacks seek the most valuable data, which is often sensitive data.

In some circumstances, a first step in protecting sensitive data is to identify and classify it into various types and levels of sensitivity. This information can be later consumed by privacy and security modules, e.g., modules that apply policies on who can access what data, or modules that secure customers' sensitive data.

But as organizations maintain ever greater volumes of data, it becomes increasingly difficult to track the sensitivity characteristics of the data. Some organizations try, with varying degrees of success, to make data owners correctly classify the data they create when they create it, or to automatically classify data correctly and consistently across the organization as the data is created. But in practice, an organization often faces the prospect of scanning data items in order to identify and classify sensitive data. Such scanning may well be very costly and time consuming, making it impractical to exhaustively scan all data items.

To reduce cost, one may sample a subset of the data items to scan. This may be useful when implementing data discovery and classification in different resolutions, such as coarse-grained classification, then fine-grained classification. However, when performing data sampling, some information about the sensitive data gets lost.

Sampling algorithm teachings provided herein can help decrease a loss of sensitivity information incident to sampling. Some of the teachings increase the "recall" of a sampling algorithm while nonetheless promoting efficient sampling by constraining the number of items scanned or otherwise limiting the scan. Some algorithms effectively sample the data in a way that increases recall, where an algorithm's "recall" refers to a combination of one or more of the following: (a) the amount (fraction) of sensitive data the algorithm identifies, (b) the diversity of the sensitive data types the algorithm finds, or (c) the accuracy of the level of sensitivity the algorithm detects.

At their core, some sensitivity scanning algorithms taught herein iteratively sample a subset of the items. At each iteration, an algorithm selects which items to scan next, based on the sensitive information the algorithm has extracted so far. The selection is made in a way that increases the algorithm's recall.

In some embodiments, the output of a sensitivity scanning algorithm has two parts: (a) a report identifying sensitive data items, and (b) aggregated data-sensitivity-related statistics such as the distribution of sensitive data in a storage system, the diversity of sensitive data types, and the sensitivity level distribution. Such aggregated statistics are useful in that they provide a high level view of data-sensitivity aspects of the system. These statistics may also be utilized by security modules to apply policies at a higher level than an individual data item level.

Failings of some other approaches can be reduced or avoided by employing innovative sensitivity scanning algorithms taught herein. Consider a naïve approach which randomly samples the stored data. This naïve approach hinders recall when the sensitive data is not uniformly distributed. For example, consider a folder A in which all files are sensitive and another folder B with no sensitive files. If one randomly samples each folder with 10% sample rate, one will find 10% of the sensitive data. But if one randomly samples 20% of the files from folder A and none from folder B, one will find 20% of the sensitive data. Sampling algorithms taught herein iteratively focus on productive folders using a feedback mechanism from one iteration to the next, which naïve random sampling does not, thereby allowing the innovative scanning algorithms to provide better recall.

Another approach selects the data items to sample based on individual storage item metadata characteristics such as document names. For example, if one scan found a document that contains sensitive data, then the next scan is directed at other documents with names that fit the same name pattern, e.g., sensitive-doc1, sensitive-doc2, sensitive-doc3, and so on. This approach is complementary to approaches taught herein, as it uses metadata patterns in individual storage items when deciding which items to select, while innovative scanning algorithms presented here do not necessarily use patterns in document names or file names to select items to scan. One failing of the name-pattern based approach and similar item-metadata-pattern-based heuristics is that they are not applicable when patterns don't exist or are not detected.

Some other approaches only consider the retrieval of as much sensitive data as possible, whereas some approaches taught herein also consider increasing the diversity of sensitive data types and the level of sensitivity identified. Thus, some approaches taught here consider additional aspects of data sensitivity. In addition, some approaches taught here provide aggregated data-sensitivity related statistics. These two additional aspects provide an added value to the customer or other consumer of sensitivity scan results.

Some embodiments described herein may be viewed by some people in a broader context. For instance, concepts such as data, categories, constraints, labels, samples, and scanning, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to efficiently estimate the respective amounts and distributions of particular kinds of sensitive data which may be present in a large collection of data that is stored in blobs or other digital artifacts. Other configured storage media, systems, and processes involving data, categories, constraints, labels, samples, or scanning are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular commands, operating systems, software development environments, programming languages, shells, software processes, development tools, identifiers, files or blobs or other stored items, containers or folders or other stored item groups, data structures, notations, categorizations, calculations, weightings, control flows, pseudocode, naming conventions, or other implementation choices that may be described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as selecting blobs or other digital artifacts which store digital data ("stored items"), scanning digital data stored in stored items, automatically allocating a specified portion of CPU cycles or power consumption or other computational resources among respective scans of containers or folders or other groupings of stored items based on computational results of prior scans, and automatically iteratively updating data sensitivity statistics in response to computational results, which are each activities deeply rooted in computing technology. Some of the technical mechanisms discussed include, e.g., an iterations-complete-condition and associated code whose behavior depends on it, a scanning-condition and associated code whose behavior depends on it, data sensitivity categories and labels and corresponding labeling criteria, and code implementing a score-i-j calculation. Some of the technical effects discussed include, e.g., updated sensitivity-presence values or updated sensitivity-diversity values (these are sensitivity statistics) which characterize the respective amounts or distributions (or both) of particular sensitivity types that match data which are present in a large collection of digital data, as well as the technical effects of tools which are guided or driven using such sensitivity statistics for activities that include assessment or verification of compliance with data protection regulations, forensic analysis, cybersecurity risk management, focused data scanning to prevent data loss, or automatic enforcement of corporate policies on the labeling and treatment of sensitive data, for example. Thus, purely mental processes are clearly excluded. Some embodiments improve the functioning of computing systems by identifying sensitive data, so that computational resource costs incurred in providing a given level of data protection can be focused on data that actually deserves that level of protection under applicable policies or regulations. Other advantages based on the technical characteristics of the teachings will also be apparent to one of skill from the description provided.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system CD: compact disc
CPU: central processing unit
Data: "data" refers to digital data; on occasion the phrase "digital data" is used herein as a reminder of this fact, but even when used without an explicit "digital" modifier, "data" refers to digital data
DLP: data loss prevention
DVD: digital versatile disk or digital video disc
FPGA: field-programmable gate array
FPU: floating point processing unit
GDPR: General Data Protection Regulation which came into force 25 May 2018, or any revision or supplement thereof currently in force to the extent permitted by applicable law
GPU: graphical processing unit
GUI: graphical user interface
IaaS or IAAS: infrastructure-as-a-service
ID: identification or identity
IoT: internet of things
IP: internet protocol
LAN: local area network
OS: operating system
PaaS or PAAS: platform-as-a-service
RAM: random access memory; "memory" herein refers to memory hardware capable of storing digital values (even if the underlying storage mechanism may be understood to have analog aspects, the memory's interface to a computing system uses digital values)
ROM: read only memory
SIEM: security information and event management software
UEFI: Unified Extensible Firmware Interface
VM: virtual machine
WAN: wide area network
Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering, in a cloud computing environment or other network or computing system environment, which provides resources or resource access to multiple programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as data sampling, automatically testing whether a condition is met to end iterative execution of a data sampling sequence, iterative execution of a data sampling sequence, automatically testing whether a condition is met to scan digital data, scanning digital data to determine whether it meets specified criteria for a particular type of sensitive data, initializing and updating data sensitivity statistics, measuring the amount of data scanned, measuring the amount of data labeled, measuring computational resource usage, and many other operations discussed, are understood herein as inherently digital. A human mind cannot interface directly with a CPU or other processor, or with RAM or other digital storage, to read and write the necessary data to perform the data security classification sampling algorithm steps taught herein. This would all be well understood by persons of skill in the art in view of the present disclosure, but others may sometimes need to be informed or reminded of the facts.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as alerting, allocating, calculating, checking, choosing, computing, defining, discerning, finding, getting, identifying, iterating, labeling, maximizing, measuring, preventing, protecting, providing, retrieving, sampling, scanning, selecting, storing, updating, utilizing (and alerts, alerted, allocates, allocated, etc.) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the *In re Nuijten* case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally, including, e.g., LANs, WANs, software defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, debuggers, profilers, compilers, interpreters, decompilers, assemblers, disassemblers, source code editors, simulators, fuzzers, repository access tools, version control tools, optimizers, collaboration tools, software development tools and tool suites, hardware development tools and tool suites, diagnostics, and so on 124 applications, e.g., word processors, web browsers, spreadsheets, games, email tools 126 display screens, also referred to as "displays"

128 computing hardware not otherwise associated with a reference number 106, 108, 110, 112, 114

202 data environment 204 data controller, namely, an entity that controls access required to process data; one example is a GDPR Article 4 controller, defined as "the natural or legal person, public authority, agency or other body which, alone or jointly with others, determines the purposes and means of the processing of personal data"

206 data processor, namely, an entity that processes data, e.g., performs computations using or modifying the data; one example is a GDPR Article 4 processor, defined as "a natural or legal person, public authority, agency or other body which processes personal data on behalf of the controller"

208 data owner, namely, an entity that legally owns rights in data; one example is a GDPR Article 4 data subject, who is the identified or identifiable natural person to whom personal data relates; another example is a natural or legal person, public authority, agency or other body which has legal rights in data such as the right to give or withhold consent over the disclosure, duplication, alteration, destruction, anonymization, pseudonymisation, usage, or processing of the data 210 other entities in a data environment, e.g., entities that provide hardware or services to a data controller 204 or processor 206 or owner 208, entities that receive services that are based on the processing of data, or unauthorized entities such as cyberattackers or employees who are acting outside the scope of their authority 212 sensitive data, namely, data which is subject to data security classification in the sense that it (a) meets one or more criteria for enhanced protection or special processing under an applicable definition of data sensitivity types, regardless of whether it has actually been identified (e.g., labeled) as such, or (b) has been categorized according to criteria that define data sensitivity types; notice that "sensitive data" accordingly includes public or non-confidential data that has been actually analyzed and identified as public or non-confidential and is subsequently not given any enhanced protection, but "sensitive data" excludes public or non-confidential data that has not yet been categorized; in other words, "sensitive data" is data that has been categorized or data that has not been categorized but would qualify for enhanced protection or special processing if it did get categorized; some examples of "enhanced protection" are access restrictions and encryption, and some examples of "special processing" are increased auditing and increased backups 302 cloud; may also be referred to as "cloud computing environment"

Figures 9, 10:
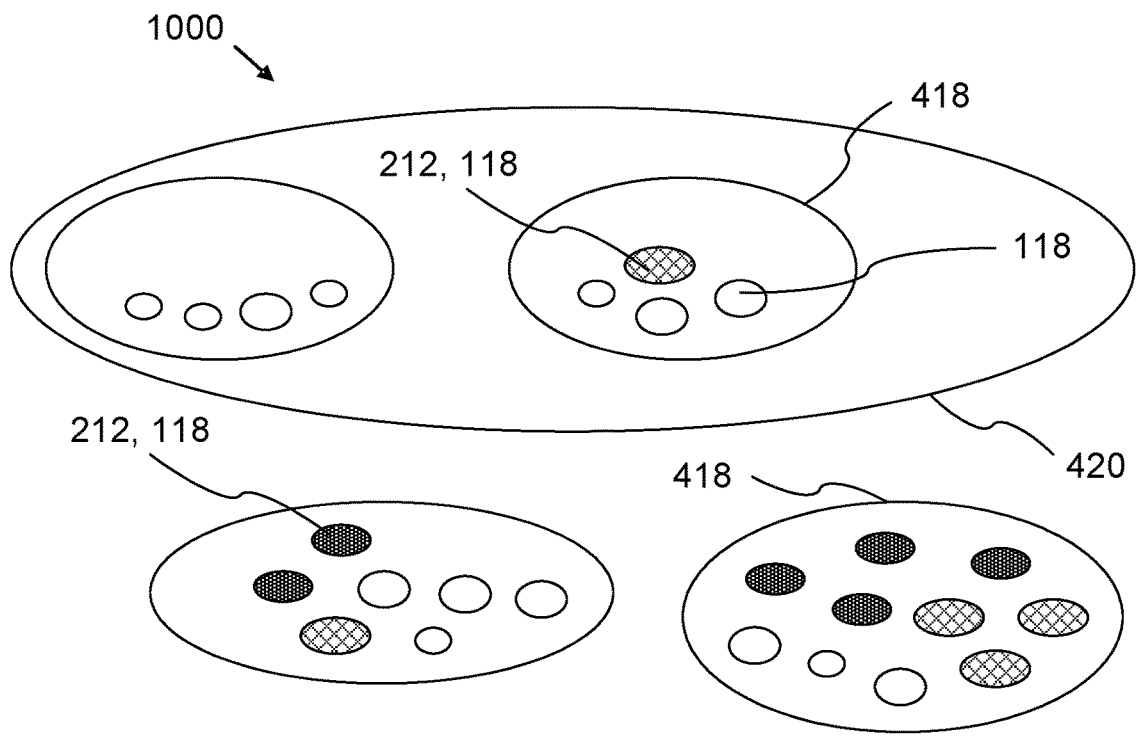
FIG. 9 is a block diagram illustrating some examples of sensitive data.
FIG. 10 is a diagram illustrating a hypothetical data environment with several stored data items, a data item group, and several categories of data.

304 virtual machine, e.g., a computing construct which provides hardware virtualization and includes an operating system 306 container, e.g., a computing construct which provides user space virtualization and does not itself include an operating system but is nonetheless reliant upon an operating system to execute 308 server; hardware and software which provides a service in a cloud or other network 310 data archive, e.g., backup storage, remote storage, storage holding data replicas or logs 400 data security classification sampling system; may also be referred to as "data classification sampling system", "data sensitivity sampling system", "enhanced system", "data categorization system", for example 402 sensitivity criterion which defines a sensitivity type 404, e.g., presence of data in a format that is used for credit card data may be a criterion 402 defining (at least in part) protected financial data 404 sensitivity type; may also be referred to as a "sensitivity category" or a "data category" for example; some examples are shown in FIG. 9; may be referred to for convenience by a corresponding label such as "private" or "secret"

406 sensitivity label, namely, a string or enumeration value (or both) which identify a sensitivity type 404; strings are not necessarily shown in quotes; some examples of sensitivity labels include: public, non-public, private, restricted, confidential, highly confidential, secret, top secret, low, medium, high, non-classified, classified, non-regulated, regulated; in some embodiments, sensitivity type names are used as sensitivity labels, e.g., "protected health information" may be used both to designate a sensitivity type and as a label for data that meets the defining criteria of protected health information 408 sampling control condition, e.g., an iterations-complete-condition, a scanning-condition, or a data sensitivity statistic whose stability determines or influences one or more iterative executions of a data sampling sequence 410 data security classification sampling code, also referred to as "data sensitivity code", for example; refers to software which upon execution performs a data sensitivity algorithm taught herein, or software which provides computational support that is specifically tailored to support such an algorithm, e.g., by computing a data sensitivity statistic taught herein 412 data sampling sequence, e.g., one iteration of the scan-set selecting, scanning, and sensitivity statistic updating activities taught herein; a data sampling sequence may also include labeling of sensitive data, or other computational data categorization actions taught herein 414 one iteration of a data sampling sequence; in pseudo-code or other prose descriptions of data sampling sequences, one iteration corresponds with a single particular value of an iteration variable (usually called "i") which is incremented at a boundary (beginning or end) of the data sampling sequence 416 scan-set, namely a set of stored items whose data was scanned, will be scanned, or is being scanned, during a given iteration of a data sampling sequence 418 stored item, namely, a digital artifact which contains digital data that may include sensitive data; some examples of stored items include: blobs, files, tables, records, objects, email messages, and email attachments; may also be referred to as a "storage item"

420 group of one or more stored items; a group 420 is a digital artifact; some examples of stored item groups include: a container, a directory, a database, a list, a tree, an account, and a repository 422 data security classification statistics, also referred to a "data sensitivity statistics"; a statistic which characterizes the respective amounts or distributions (or both) of one or more sensitivity types that match data that is present in a collection of stored items 424 sampling allotment, namely, a portion or amount of a computational resource which is allocated to a particular sampling activity, such as the sampling of data of a particular group 420; may also be referred to as a "budget" with the understanding that the meaning is not per se financial but refers instead to allocation of computational resources 426 objective function 428 user interface; may include APIs, a GUI, or both 430 data scanner, e.g., software tailored to identify data of a particular sensitivity type; may utilize parsing, regular expressions, keyword searches, size expectations, format expectations, and other mechanisms to perform or support such identification 432 metadata of a stored item group 420, e.g., permissions, ownership, modification dates or history, size, storage location, existence of replicas, etc.

502 iterations-complete-condition, e.g., one or more criteria or tests which determine or influence whether an additional iterative execution of a data sampling sequence will be performed 504 scanning-condition, e.g., one or more criteria or tests which determine or influence whether a scan of stored item data which searches for the presence of data of one or more particular sensitivity types will be performed 506 basis for an allotment (also referred to as an "allocation" or "budget") of computational resources to a particular activity such as a scan which searches for the presence of data of one or more particular sensitivity types 508 an amount of time; may be user wall-clock time or processor time (e.g., nanoseconds of processing or processor cycles)

510 computational resource amount generally, e.g., amount of storage, amount of processor time, amount of data processed, amount of electric power consumed by the system 400

512 amount of electric power consumed, e.g., in watts 514 number of stored items 418

516 amount of stored item data, measured in memory bytes, memory words, memory pages, memory blocks, or another storage allocation unit 602 number of iterations; may be indicated by an iteration variable i 604 amount of data labeled 606 statistic stability; may be measured e.g. as size or variation in a confidence interval, variation in a formula based on a statistical value, adherence of successive values to a horizontal or other trend line, relative or absolute difference between two successive values, deviation from a mean, a moving average, root mean square deviation, or using familiar convergence measures 608 amount of data scanned 610 number 514 of stored items scanned for sensitive data 612 number 514 of stored items labeled with a sensitivity label 406

702 sensitivity-presence; this is a sensitivity statistic which measures a number of stored items or some other indication of data amount 516 which have been scanned (and possibly labeled) as to the presence/absence of sensitive data, relative to a measure of all stored items or data of the group or another portion (or entirety) of a particular collection of data 704 sensitivity-diversity; this is a sensitivity statistic which measures an amount of sensitivity types of stored items which have been scanned (and possibly labeled) as to the presence/absence of sensitive data, relative to a measure of all defined sensitivity types 706 any weighting or weighted combination of one or more sensitivity statistics 800 consumer of sensitivity statistics 802 data privacy tool, e.g., software which detects or inhibits user action tracking scripts or advertising scripts, deletes or inhibits browser cookies, or provides anonymization of user actions 804 data security tools, e.g., virtual private network software, encryption and decryption software, identity authentication software, SIEMs, logging tools, intrusion detection tools, intrusion prevention tools, data loss prevention software, cloud security software, remote wipe software 806 data loss prevention software, e.g., tools which detect potential data exfiltration transmissions; some of these tools also reduce or prevent such transmissions 808 risk management tools, e.g., software which provides managers with dashboards and reports summarizing the status of information assets, attacks against these assets, response times, impacts of the attacks, or estimates of attack likelihood 810 forensic tools, e.g., software which searches a forensic copy of data and provides an inventory of the kinds of data found, including deleted data; a forensic copy is a bitwise copy which is subject to chain-of-custody protection against tampering 812 regulatory compliance tools, e.g., software which lists or summarizes regulations that govern sensitive data, and tracks or produces evidence of compliance with such regulations 814 litigation evidence production tools, e.g., software which searches, inventories, stamps for production, redacts, categorizes as to legal privilege, or otherwise processes electronic documents in the context of expected or actual litigation 902 physical or mental health information, e.g., information such as a medical history, medical diagnosis, medications, medical service provider identity 904 financial information, e.g., credit history, bank or credit card statements, bank or credit card account numbers, invoice, payment history 906 racial or ethnic data, e.g., racial identification, ethnic identification 908 identity data, e.g., name, government ID number or content, residential address, phone number, email address, physical description 910 sexual data, e.g., gender, sexual orientation 912 trade secret data, e.g., data which qualifies as a trade secret under the Uniform Trade Secrets Act or Economic Espionage Act in the United States or the Trade Secrets Directive in Europe or similar laws in other jurisdictions 914 biometric data, e.g., fingerprint, DNA (deoxyribonucleic acid) data, voiceprint, iris description, palm print, gait, and other data specific to a particular human person 916 genetic data, e.g., DNA or ribonucleic acid (RNA) samples or descriptions; descriptions of a person's heredity or inherited traits 918 religious data, e.g., membership or expressed support for or antipathy toward a religion or a religious sect or denomination or congregation or event or observance or organization or viewpoint or opinion 920 political data, e.g., membership or expressed support for or antipathy toward a political party or political movement or political group or political event or political organization or political viewpoint or political opinion 922 marital data, e.g., marital status, marital history, identification of fiancée or spouse 924 family data, e.g., identification of family members, family name, or family history or genealogy 926 confidential commercial information, e.g., trade secret data of a commercial entity, or data which is not public and does not necessarily meet the applicable legal definition of a trade secret 1000 collection of data 118

Figure 11:
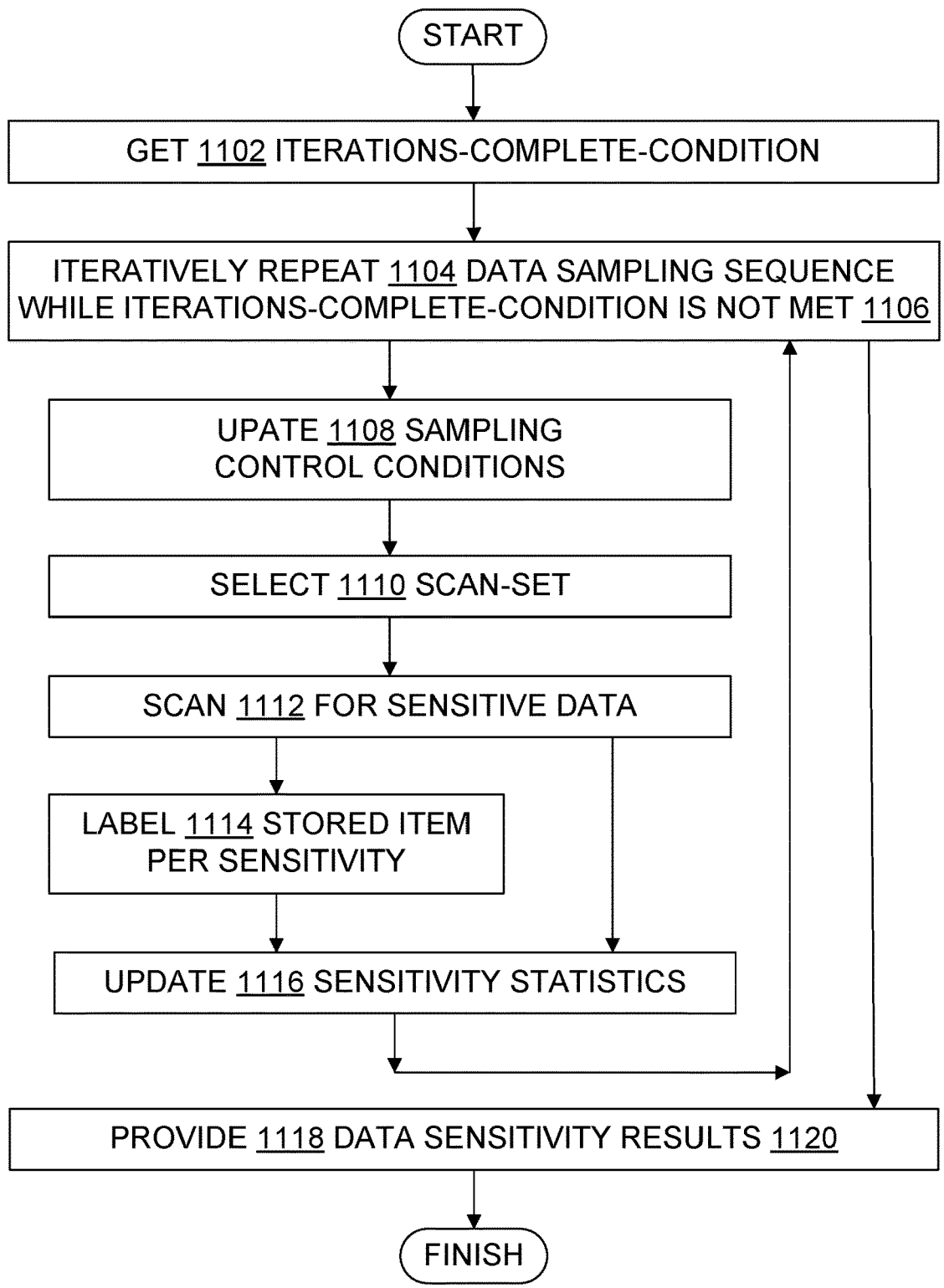
FIG. 11 is a flowchart illustrating steps in some data security classification sampling methods.

1100 data security classification sampling method flowchart; 1100 also refers to data security classification sampling methods illustrated by or consistent with the FIG. 11 flowchart, and to the act of using such a method 1102 get an iterations-complete-condition, e.g., through a GUI or other user interface, or a configuration file or setting, or as a default embedded in code 1104 iteratively repeat in a computing system the execution of a data sampling sequence (e.g., a sequence including performance of steps 1108, 1110, 1112, 1116, or a sequence including performance of steps 1108, 1110, 1112, 1114, 1116)

1106 actions regarding computationally determination of whether an iterations-complete-condition is satisfied; an instance of numeral 1106 may refer to testing the iterations-complete-condition, to finding that the iterations-complete-condition is met, or to finding that the iterations-complete-condition is not met, as indicated by the context of the particular instance of the numeral 1106

1108 computationally update one or more sampling control conditions 408

1110 computationally select a scan-set 416

1112 computationally scan stored items of the selected scan-set 1114 label a stored item per the sensitivity type(s) found by scanning, e.g., by updating a data structure that is stored within, indexed to, points to, or is otherwise computationally associated with, the stored item 1116 computationally update one or more sensitivity statistics 422

1118 electronically provide data sensitivity results 1120, e.g., by transmission through a user interface 428 of data representing the results 1120

Figure 12:
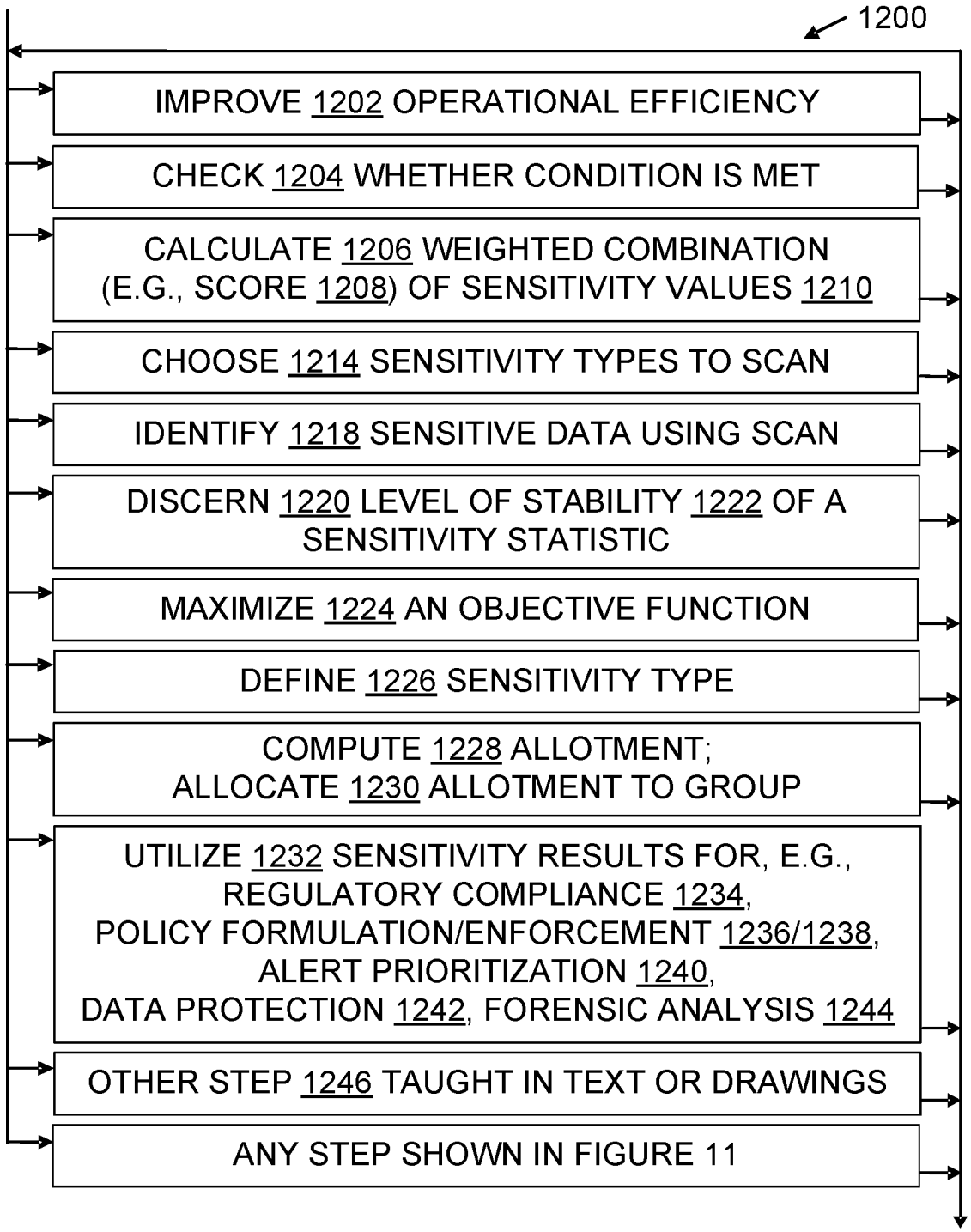
FIG. 12 is a flowchart further illustrating steps in some data security classification sampling methods.

1120 data sensitivity results 1120, e.g., sensitivity statistics 422; results 1120 may in addition include information about the processing that produced the sensitivity statistics 422, such as computational resources or time expended, an iteration count, details of the sampling control conditions, and so on 1200 flowchart; 1200 also refers to data security classification sampling methods illustrated by or consistent with the FIG. 12 flowchart (which incorporates the steps of FIG. 11); recall that "data security classification sampling" and "data sensitivity sampling" are used interchangeably herein 1202 improve operational efficiency of data sensitivity sampling per se, or the operational efficiency of tools (e.g., consumers 800) that consume information obtained by data sensitivity sampling; "operational efficiency" implicates computational cost or measured user satisfaction or both, e.g., operational efficiency is improved relative to a prior configuration or experience when the computational cost for a given level of recall goes down or the measured user satisfaction for user-acceptable sensitivity results goes up, or both occur 1204 computationally check whether a sampling control condition 502 or 504 is met 1206 calculate a weighted combination of one or more sensitivity values, e.g., by calculating an expression that combines a weight and a data sensitivity statistic 422, or by calculating an expression that combines two weights and two respective data sensitivity statistics 422

1208 score, namely, a value calculated from an expression that combines two weights and two respective data sensitivity statistics 422

1210 sensitivity value, e.g., a data sensitivity statistic value or a weight which increases or decreases the contribution of a data sensitivity statistic value in an expression 1214 choose one or more sensitivity types to scan for, e.g., scan for confidential data, or scan for restricted data or regulated data; sensitivity types may also chosen 1214 based on the kind of sensitive data the scan will look for, e.g., scan for health information, or scan for financial information 1218 identify sensitive data using a scan, e.g., computationally determine that a set of data has the format of a credit card number or contains the keyword "confidential" or starts with an embedded file type signature that indicates palm print data 1220 discern a sensitivity statistic stability 606 while iterating 1104 through a data sampling sequence 412

1222 desired level or threshold of sensitivity statistic stability 606

1224 maximize an objective function 426; this may be a desired side effect of performing a data sensitivity sampling method, as opposed to being an explicit series of computations while performing the method 1226 define a sensitivity type, e.g., by configuring a scanner 430 to recognize one or more particular kinds of 212 of sensitive data and mapping that recognition to a sensitivity label 406 in the operation of code 410

1228 compute an allotment 424

1230 allocate an allotment to a group 420, e.g., by tracking resource usage 510 while scanning the stored items of the group and discontinuing scanning (at least during a current iteration) when the allocated amount of resource allotted to the group has been expended 1232 utilize sensitivity results, e.g., compute recommendations or take actions based at least in part on the sensitivity results 1234 regulatory compliance (noun) or comply with regulations 1236 policy formulation (noun) or formulate policy 1238 policy enforcement (noun) or enforce policy 1240 alert prioritization (noun) or prioritize alerts 1242 data protection (noun) or protect data 1244 forensic analysis (noun) or analyze forensically 1246 any step discussed in the present disclosure that has not been assigned some other reference numeral Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and multiple cooperating machines also form a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be collected into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

With reference to FIGS. 1 through 10, some embodiments use or provide a functionality-enhanced system 400. The functionality enhancement promotes information assurance by efficiently gathering useful information about what types of sensitive data are stored, and where it is stored.

Figure 2:
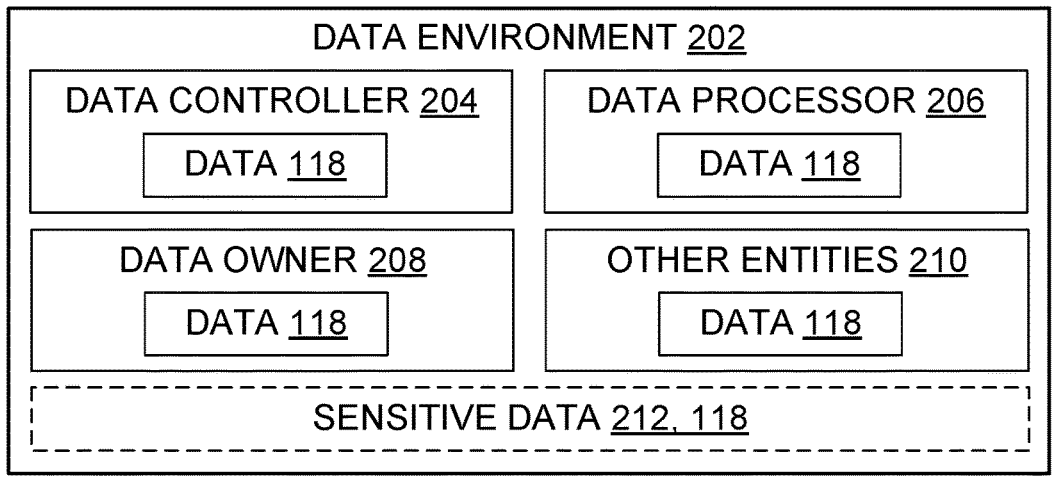
FIG. 2 is a block diagram illustrating some roles in a data environment.

FIG. 2 illustrates a data environment 202 containing data 118 that may be found, upon sampling, to include sensitive data 212. The data 118 is owned by one or more data owners 208, and may be processed by one or more data processors 206 under the direction of one or more data controllers 204. Other entities 210 may also play some role. Knowing the various roles involved, and who fills those roles in a given data environment 202, provides a starting point or framework for determining expectations as to what sensitive data 212 may be present, who may have access to it, and for what purposes. Then sensitivity sampling can be performed as taught herein, in order to confirm such expectations, to refine them, or in some cases to discover flaws or omissions in them. Note that a given entity may fill more than one role, and a role may be filled by one or more entities.

In one example scenario, data owners 208 include consumers 104 who purchase goods through online transactions. In this scenario, data controllers 204 include merchants 104 who receive payment information 904 such as credit card numbers and personal information 908 such as addresses and other contact info, and who authorize shipment of goods in response to the payment info. Data processors 206 include credit card issuers such as banks and credit unions. Other entities 210 that may have access to data 118 include internet service providers, package delivery service providers, and regulatory officials.

Other scenarios will differ in some respects, e.g., the data owners 208 may be patients, the data controllers 204 may include hospitals, clinics, doctors, and nurses, and the sensitive data 212 may include health information 902. Nonetheless, sensitivity sampling can be performed as taught herein to help manage sensitive information 212 in ways that promote security, respect for individual privacy, and compliance with applicable laws and regulations.

Figure 3:
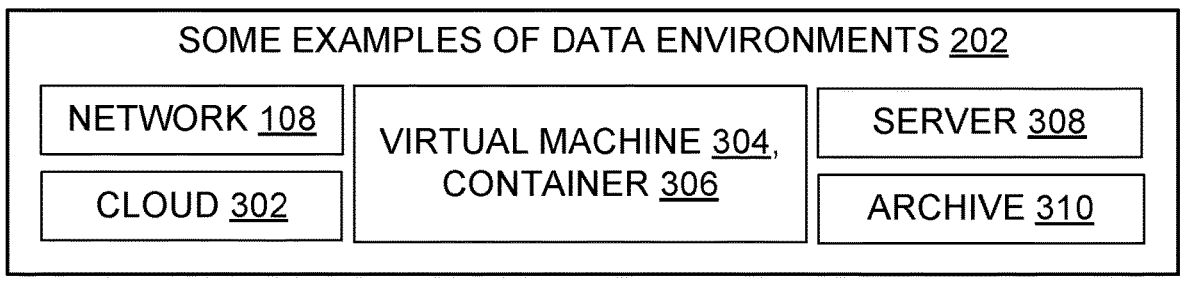
FIG. 3 is a block diagram illustrating some examples of data environments.

FIG. 3 shows some examples of data environments 202. Examples shown include a network 108, a cloud 302, a virtual machine 304, a container 306, a server 308, and a data archive 310. One of skill will recognize that some of these environments may overlap, e.g., a virtual machine 304 may reside in a cloud 302. Also, multiple environments such as a server 308 and an archive 310 may be part of a larger data environment 202.

Figure 4:
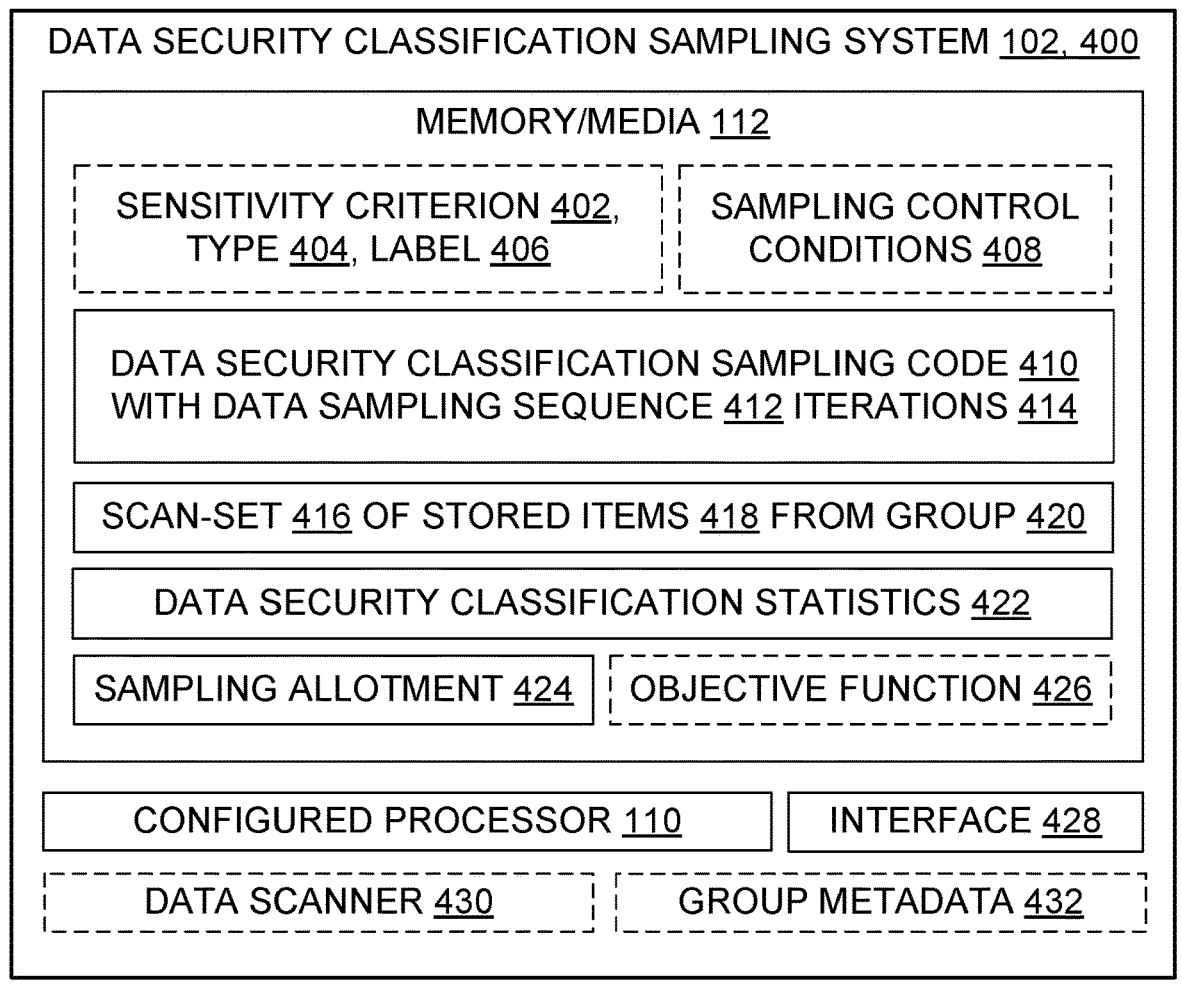
FIG. 4 is a block diagram illustrating aspects of a system which is configured with sampling functionality for obtaining statistics about sensitive data, namely, statistics about data which is subject to data security classification.

FIG. 4 illustrates a system 102, 400 which is enhanced with functionality for data sensitivity sampling as taught herein. In this example, the functionality enhancements include data security classification sampling code 410, which in operation executes iterations 414 of a data sampling sequence 412. A given iteration accesses and scans a scan-set 416 of stored items 418, which are selected from a collection of stored items. Some collections 1000 are multilevel, in that they are subdivided into groups 420 of stored items 418 such as folders or containers, while other collections 1000 have a single level flat topology. Under the constraints of sampling control conditions 408, the iterations generate sensitivity statistics 422, which are provided to statistics consumers 800 through an interface 428. For efficiency, sampling is both limited and focused through sampling allotments 424. Scanning is performed by data scanners 430, which look for data 212 that meets criteria 402 of a given sensitivity type 404. Sensitivity types 404 are named using sensitivity labels 406.

Figure 5:
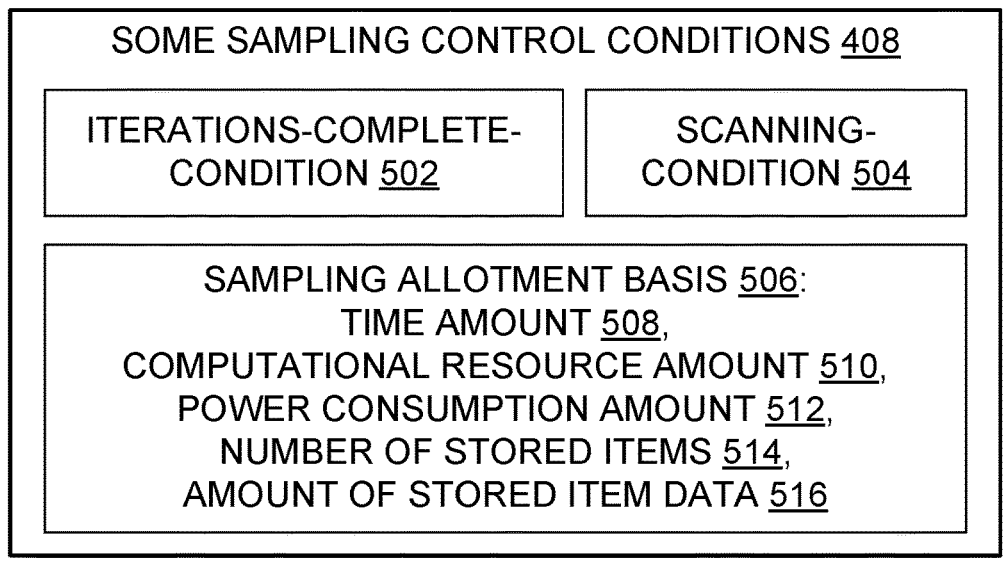
FIG. 5 is a block diagram illustrating some conditions that may control data security classification sampling.

FIG. 5 illustrates two kinds of sampling control conditions 408, namely, iterations-complete-conditions 502 that control how many iterations 414 are performed, and scanning-conditions 504 that control what scanners 430 are invoked. FIG. 5 also shows some of the bases that sampling control conditions may consider, e.g., time spent 508, CPU or memory or bandwidth or other computational resource spent 510, electric power spent 512 (this may also be considered a computational resource), the number of stored items 514 (e.g., number of files or blobs or database tables), or the amount of data in stored items 516 (e.g., megabytes or storage blocks).

Figure 6:
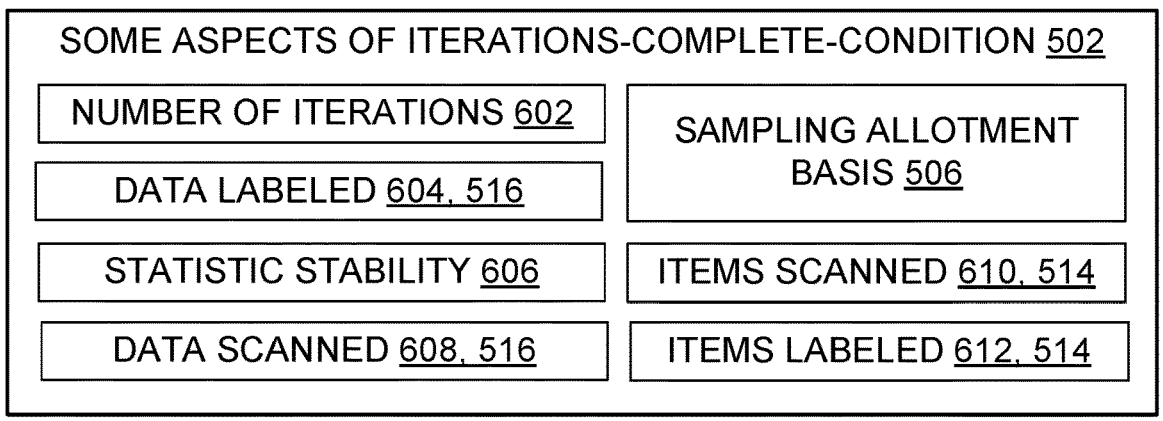
FIG. 6 is a block diagram illustrating some aspects of conditions that may control whether iterative sampling of data to obtain data sensitivity statistics is considered complete.

FIG. 6 further illustrates some of the bases that iterations-complete-conditions 502 in particular may consider in some embodiments. Some additional considerations may be, e.g., number of iterations completed 602, the number of stored items 514, 610 (e.g., number of files or blobs or database tables) which have been scanned, the number of stored items 514, 612 which have been labeled, the amount of data in labeled stored items 516, 604, or the stability 606 of a sensitivity statistic 422 over two or more iterations. In other embodiments, one or more bases shown in FIG. 6 may also or alternatively be a consideration relied upon in a scanning-condition 504.

Figure 7:
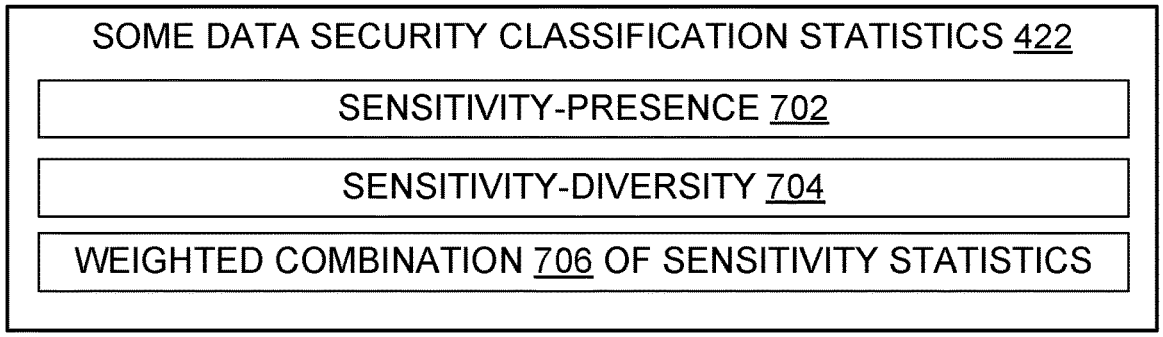
FIG. 7 is a block diagram illustrating some data sensitivity statistics, which are also referred to as "data security classification statistics"

FIG. 7 show some data sensitivity statistics 422. A sensitivity-presence statistic 702 provides information about the presence or absence of sensitive data 212 relative to data 118 overall in an environment 202. For example, a sensitivity-presence statistic 702 may indicate that sampling shows 12% of sampled data items 418 hold health information 902, or that 17% of the sampled blocks of data included regulated data or highly confidential data. A sensitivity-diversity statistic 704 provides information about the presence or absence of different types 404 of sensitive data 212 relative to all defined sensitivity types 404 in an environment 202. For example, a sensitivity-diversity statistic 704 may indicate that sampling shows some confidential data and some secret data but no top secret data.

As also illustrated in FIG. 7, a sensitivity statistic 422 may be calculated as a weighted combination 706 of underlying individual sensitivity statistics 422. For example, a risk measure 706, 422 that is weighted toward the presence of sensitive data 212 of any kind may be calculated as a normalized sum of four times a sensitivity-presence statistic 702 plus a sensitivity-diversity statistic 704. As another example, suppose a medical invoice typically contains confidential financial information 904, 404 and confidential contact information 908, 404. Then a data loss prevention tool 806 or a forensic tool 810 may be guided by sampling results to documents 418 that have an invoice likelihood statistic 706 value that is above, say, a threshold of 0.8, where the invoice likelihood statistic is calculated as one-half the likelihood of confidential financial information 904, 404 being in the document plus one-half the likelihood of confidential contact information 908, 404 being in the document, each likelihood being in a range from zero to one. Of course, other factors and thresholds and underlying statistics 422 may be used in other examples.

Figure 8:
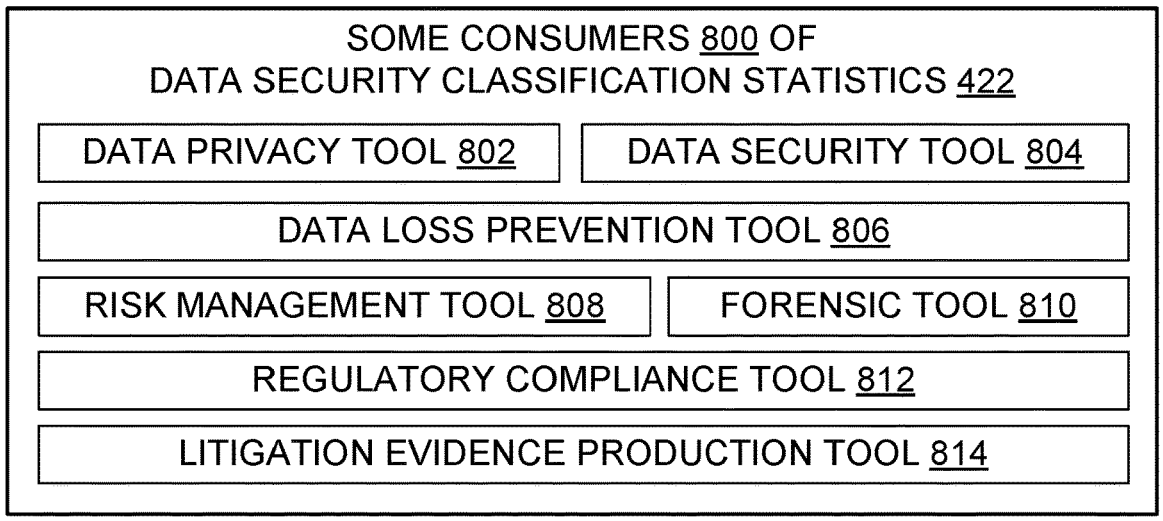
FIG. 8 is a block diagram illustrating some consumers of data sensitivity statistics.

FIG. 8 illustrates some consumers 800 of data sensitivity statistics 422. Consumption is presumed to occur through electronic transmission of the data sensitivity statistics 422, e.g., using one or more packets, pipes, messages, signals, files, or other electronic transmission mechanisms. Example consumers shown include a data privacy tool 802, a data security tool 804, a data loss prevention tool 806, a risk management tool 808, a forensic tool 810, a regulatory compliance tool 812, and a litigation evidence production tool 814. Other tools 800 may also or alternatively consume data sensitivity statistics 422 in a given computing environment 100. Also, a given tool may be an example of more than one of the listed consumer categories, e.g., a tool which detects anomalous data transmissions from within an enterprise may operate as a data privacy tool 802, a data security tool 804, and a data loss prevention tool 806.

FIG. 9 illustrates some examples of sensitive data 212. The examples of sensitive data types 404 and labels 406 shown in FIG. 9 include health information 902, financial information 904, racial or ethnic data 906, identity data 908, sexual data 910, trade secret data 912, biometric data 914, genetic data 916, religious data 918, political data 920, marital data 922, family data 924, and confidential commercial information 926. A given embodiment may use some, all, or none of these particular categories, and may also use other categories, e.g., categories tailored to a particular environment 202 such as product formulations, trade negotiation notes, succession plans, and so on.

In some embodiments, data categories also serve as sensitivity types 404. For example, a stored item 418 whose data 118 includes credit card numbers could be labeled as "confidential" or as "financial information" or both, with data sensitivity type(s) 404 corresponding to the label(s).

In some embodiments, sensitivity types 404 are combined. For example, in a given embodiment, a highly confidential type 404 with a label "highly confidential" may correspond to any combination of health information 902, financial information 904, or biometric data 914.

FIG. 10 illustrates a hypothetical data environment with several stored data items 418, a data item group 420, and several categories of data 118. Sensitive data 212 is indicated in this Figure by cross-hatching. Darker or denser cross-hatching corresponds to a higher level of sensitivity.

Some embodiments use or provide a data security classification sampling system 400, 102 which scans at least part of an environment 202 for sensitive data 212, updates sensitive data statistics 422, and labels the sensitive data it finds, using a defined set of labels 406. Some other embodiments scan for sensitive data and update sensitive data statistics, but do not necessarily label the data, or are designed to avoid labeling the data. Labeling data 118 may be accomplished, e.g., by labeling the stored items 418 containing the data 118.

Some embodiments use or provide a data security classification sampling system 400, 102 which includes a memory 112 and a processor 110 in operable communication with the memory. The processor is configured to configure the memory with instructions and data and to perform steps which include providing data security classification statistics by (a) getting an iterations-complete-condition 502, and (b) iteratively repeating a data sampling sequence 412 until the iterations-complete-condition is met. The data sampling sequence of a current iteration 414 includes (b1) selecting a current iteration scan-set 416 of stored items 418 from a group 420 of stored items, with the selecting based at least partially on a current iteration sampling allotment 424, (b2) when a scanning-condition 504 is met then in response scanning data of the current iteration scan-set for sensitive data 212 which meets a predefined sensitivity criterion 402 which defines a sensitivity type 404, (b3) when scanned data of a particular stored item of the current iteration scan-set includes sensitive data which meets the predefined sensitivity criterion, then in response labeling the particular stored item with a predefined sensitivity label 406 which corresponds to the predefined sensitivity criterion, and when the scanned data of a particular stored item does not include data which meets the predefined sensitivity criterion, then in response avoiding labeling the particular stored item with the predefined sensitivity label, (b4) updating a data security classification statistical measure 422 in response to the labeling or the avoiding labeling, (b5) calculating a next iteration sampling allotment 424 which is based at least partially on the current iteration sampling allotment and the data security classification statistical measure, and (b6) when the iterations-complete-condition is not met, then in response using the next iteration sampling allotment as the current iteration sampling allotment of a next iteration of the data sampling sequence.

Some embodiments automatically choose which scanners 430 to use, based on some criteria, e.g., the data types found so far, a data container's characteristics, statistics gathered, iteration number, scanner's activation cost, or a combination thereof. In some embodiments, multiple data scanners 430 are configured to perform scanning for sensitive data 212 which meets a respective predefined sensitivity criterion 402 implemented in the scanner. The processor 110 is configured to set the scanning-condition 504 to enable zero or more scanners 430 for a particular iteration 414 based on at least one of the following: which sensitivity type 404 or combination of sensitivity types have been found by previous scanning, metadata 432 of the group 420 of stored items, the data security classification statistical measure 422, an iteration number 602 which indicates how many iterations 414 of the data sampling sequence have been performed, or a computational cost 510 that is associated with a particular scanner.

In some embodiments, the allotments which help increase sampling efficiency by increasing algorithm recall can be measured or constrained in terms of the number of blobs to scan, or some other measure. In some, a current iteration sampling allotment 424 for a first iteration is based on at least one of the following: an amount of time 508, an amount of a computational resource 510, an amount of power consumption 512, a number 514 of stored items 418, or an amount 516 of stored item 418 data 118.

In some embodiments, criteria 502 for stopping sampling may be specified in terms of an iteration count 602, or any other limit on resources 510 or costs, such as time 508, power 512, expected computation cost, and so on, individually or in combination. Stopping criteria 502 could also be based on scores 422 stability 606. In some embodiments, the iterations-complete-condition 502 includes or otherwise relies on at least one of the following: a maximum number 602 of iterations 414, a minimum number 602 of iterations 414, a maximum time 508 expended during iterations, a minimum time 508 expended during iterations, a maximum computational resource 510 used during iterations, a minimum computational resource 510 used during iterations, a maximum power consumption 512 during iterations, a minimum power consumption 512 during iterations, a maximum number 514 of stored items 418 scanned during iterations 414, a minimum number 514 of stored items 418 scanned during iterations 414, a maximum number 514 of stored items 418 labeled during iterations 414, a minimum number 514 of stored items 418 labeled during iterations 414, a maximum amount 516 of data 118 scanned during iterations 414, a minimum amount 516 of data 118 scanned during iterations 414, or a specified stability 606 of the data security classification statistical measure 422 during iterations 414.

In some embodiments, stored items 418 are subdivided, e.g., they can be partitioned into groups 420. In some, a current iteration scan-set 416 includes stored items 418 from a plurality of groups 420 of stored items, and a portion of the current iteration's entire sampling allotment 424 is (or equivalently for the present scenario, was) allocated to each of the groups. In some embodiments, blobs or other storage items 418 are not divided among containers. This may be viewed as a special case in which there is only one container 420 which holds all of the blobs 418. But in practice, it is expected that many data collections will be organized using groups 420, so some partitioning of stored items 418 may be assumed. Indeed, in many cases the groups will likely have different distributions of data sensitivity characteristics.

In some embodiments, the data security classification statistical measure 422 includes at least one of the following: a sensitivity-presence value 702 which measures stored items which have been labeled during iterations performed so far, relative to a measure of all stored items of the group; a sensitivity-diversity value 704 which measures an amount of sensitivity types of stored items which have been labeled during iterations performed so far, relative to a measure of all defined sensitivity types.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided herein to help illustrate aspects of the technology, but the examples given within this document do not describe all of the possible embodiments. Embodiments are not limited to the specific component names, optimizations, algorithmic choices, data, data types, configurations, implementations, arrangements, displays, features, approaches, or scenarios provided herein. A given embodiment may include additional or different technical features, mechanisms, sequences, data structures, or functionalities for instance, and may otherwise depart from the examples provided herein.

Processes (a.k.a. Methods)

FIG. 11 illustrates a method 1100 which is an example of methods that may be performed or assisted by an enhanced system 400. The enhanced system gets 1102 an iterations-complete-condition 502 during an initialization. Then the system iteratively repeats 1104 a data sampling sequence 412 until the iterations-complete-condition 502 is satisfied. During each iteration 414 of the illustrated data sampling sequence, the system updates 1108 sampling control conditions. Although for clarity of illustration step 1108 is represented in FIG. 11 by a single box at the top of the data sampling sequence, step 1108 may be done at other points in the execution, and parts of step 1108 may be done at different points in the data sampling sequence execution. For example, the scanning-condition 504 may be updated right before a decision is made about which scanners 430 to execute during a scanning 1112 step. Also, the iterations-complete-condition 502 may be updated right before testing the iterations-complete-condition to determine whether the most recent iteration will be the final iteration because the iterations-complete-condition is satisfied.

The illustrated sampling sequence 412 includes selecting 1110 a scan-set. Examples of stored item selection are provided herein, using pseudocode and formulas, but selection 1110 is not limited to those particular examples.

The illustrated sampling sequence 412 also includes scanning 1112 stored items (that is, scanning data they hold) for sensitive data. The illustrated sampling sequence 412 optionally includes labeling 1114 stored items based on the sensitive data 212 found within them. The illustrated sampling sequence 412 also includes updating 1116 sensitivity statistics 422. Examples of sensitivity statistics 422 are provided herein, but statistics 422 are not limited to those particular examples.

The illustrated method 1100 also provides 1118 data sensitivity results 1120, e.g., for consumption by a consumer 800. In FIG. 11, data sensitivity results 1120 are provided 1118 after the execution of all the sampling sequence 412 iterations 414, but some embodiments provide 1118 interim results before the iterations-complete-condition is satisfied.

FIG. 12 further illustrates efficient data sensitivity sampling methods (these methods may also be referred to as "processes" in the legal sense of that word) that are suitable for use during operation of a sensitivity sampling system 400, including some refinements, supplements, or contextual actions for steps shown in FIG. 11. Technical processes shown in the Figures or otherwise disclosed will be performed automatically, e.g., by risk management tools 808, unless otherwise indicated. Processes may also be performed in part automatically and in part manually to the extent action by a human administrator or other human person is implicated, e.g., in some embodiments a person may specify a particular storage device, a particular set of machines, or a particular repository or other environment 202 to sample for sensitive data. Resource constraints underlying an iterations-complete-condition 502 may also be manually entered by an administrator, for example. However, no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 11 and 12. Steps may be performed serially, in a partially overlapping manner, or fully in parallel. In particular, the order in which flowchart 1100 action items or flowchart 1200 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a data security classification sampling method, the method including performing operations as described by the following pseudocode:

allocating 1230 an initial sampling allotment among m groups of stored data items, m being an integer greater than one;

repeating 1104 for each iteration i until an iterations-complete-condition is met 1106:
for each group group-j of stored data items, j ranging from one to m:
selecting 1110 a scan-set scan-set-i-j of stored items from within group group-j, the selecting 1110 based at least partially on a sampling allotment allotment-i-j which is based at least partially on a data security classification statistical measure score-i-j 706, wherein score-i-j is based at least partially on sensitive data identified so far by scanning 1112 data of stored items;
when a scanning-condition is met then in response scanning 1112 data of the scan-set scan-set-i-j of stored items for sensitive data, wherein sensitive data is data that meets a predefined sensitivity criterion which defines a sensitivity type;
when a scanned particular stored item of the current iteration scan-set includes sensitive data, then in response updating 1116 score-i-j;
providing 1118 a data sensitivity result to at least one of the following consumers 800: a data privacy tool, a data security tool, a data loss prevention tool, a risk management tool, a regulatory compliance tool, a forensics tool, computational resource administration tool, or a litigation evidence production tool.

In some embodiments according to the foregoing method, providing 1118 data sensitivity results includes providing at least one of the following:
each score-i-j;
a per-group data security classification statistical measure score-j which is based on score-i-j values for group-j over multiple iterations;
a per-group sensitivity-presence value sensitivity-presence-j which measures sensitive data identified in group group-j relative to a measure of all data of group-j;
a per-group sensitivity-diversity value sensitivity-diversity-j which measures an amount of sensitivity types of data identified in group group-j relative to a measure of all defined sensitivity types;
an overall data security classification statistical measure score which is based on score-i-j values for all groups over all iterations; or
an overall sensitivity-presence value which measures sensitive data identified in all groups over all iterations relative to a measure of all data in all groups; or
an overall sensitivity-diversity value which measures an amount of sensitivity types of data identified in all groups over all iterations relative to a measure of all defined sensitivity types.

In some embodiments according to the foregoing method, the method further includes at least one of the following steps: choosing 1214 on a per-group basis which zero or more sensitivity types to scan data for in a particular group-j; choosing 1214 on a per-iteration basis which zero or more sensitivity types to scan data for during a particular iteration i; or scanning 1112 data for different sensitivity types at different times during the method.

In some embodiments according to the foregoing method, the method further includes labeling 1114 sensitive data during the operations with at least one predefined sensitivity label 406 which corresponds to the predefined sensitivity criterion satisfied by the sensitive data, after the sensitive data is identified by scanning during the operations.

In some embodiments according to the foregoing method, the method includes meeting 1106 the iterations-complete-condition by discerning 1220 a specified level of stability 1222 of the data security classification statistical measure 422 over at least two iterations 414.

In some embodiments discussed herein, selecting 1110 a scan-set of stored items includes selecting at least one of the following stored items 418: blobs, files, tables, records, objects, email messages, email attachments. In some, selecting 1110 a scan-set of stored items 418 from within a group 420 includes selecting stored items from within at least one of the following stored item groups 420: a container, a directory, a database, a list, a tree, an account, a repository.

In some embodiments, a sampling method performs operations which maximize 1224 an objective function 426. One example of an objective function 426 is a sensitive-items-recall objective function 426 which computes at least: a value based on a number of stored items in a group which have been identified as containing sensitive data divided by a value based on a number of stored items in the group which actually contain sensitive data.

Another example of an objective function 426 is a sensitivity-types-recall objective function 426 which computes at least: a value based on a number of distinct sensitivity types of stored items in a group which have been identified as containing sensitive data divided by a value based on a number of distinct sensitivity types of stored items in the group which actually contain sensitive data.

Another example of an objective function 426 is a labeling-error objective function which computes at least a difference between a numeric weight of a most sensitive identified sensitivity type of stored items in a group and a numeric weight of an actual most sensitive sensitivity type of stored items in the group. The weights of the sensitivity types are not necessarily 0 through n, but in some embodiments sensitivity types are linearly ordered according to sensitivity and assigned their position in the ordering as a weight with regard to an objective function. For instance, an embodiment may define public, low, medium, and high sensitivity types, with public given a weight of zero, low given a weight of 1, medium given a weight of 2, and high given a weight of 3. In some embodiments, a container is labeled according to the data types that exist in its blobs, having the highest label in the hierarchy. Although the labeling error objective function 426 might be understood to assume only one label per container, in some embodiments a container or other group 420 may have multiple labels, e.g., to the effect that "this container has confidential GDPR and confidential data". For calculations involving the labeling error objective function, the container gets the highest (most severe) sensitivity label. One could also generalize to multiple labels and define a different labeling error metric.

Method and other embodiments may scan for various kinds or types of sensitive data. In some embodiments, scanning 1112 data of stored items for sensitive data 212 includes scanning for at least one of the following: personal or protected health information 902, personal or commercial financial information 904, personally identifiable information 908, biometric data 914, genetic data 916, racial data 906, ethnic data 906, data 918 describing a religious affiliation or belief, data 920 describing a political affiliation or opinion, online identity 908, data 910 describing a sexual orientation or preference, marital status 922, personal or family relationship data 924, trade secret data 912, or confidential commercial information 926.

In some embodiments, scanning 1112 scanning data 118 of stored items for sensitive data includes scanning for sensitive data which meets the predefined sensitivity criterion 402 defining at least one of the following sensitivity types 404: public, non-public, private, restricted, confidential, highly confidential, secret, top secret, low, medium, high, non-classified, classified, non-regulated, regulated, subject to a specific regulation or a specific law.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as data sensitivity sampling code 410, data sensitivity sampling statistics 422, sampling allotments 424, code implementing objective functions 426, and sampling control conditions 408, in the form of data 118 and instructions 116, read from a removable storage medium 114 and/or another source such as a network connection, to form a configured storage medium. The configured storage medium 112 is capable of causing a computer system 210 to perform technical process steps for efficiently sampling data for data classification status discovery and policy enforcement, as disclosed herein. The Figures thus help illustrate configured storage media embodiments and process (a.k.a. method) embodiments, as well as system and process embodiments. In particular, any of the process steps illustrated in FIG. 11 or 12, or otherwise taught herein, may be used to help configure a storage medium to form a configured storage medium embodiment.

Some embodiments use or provide a computer-readable storage medium 112, 114 configured with data 118 and instructions 116 which upon execution by a processor 110 perform a data security classification sampling method. This method includes providing data sensitivity results which are computed by: repeating 1104 iterations of a data sampling sequence until an iterations-complete-condition is met 1106, 1204, wherein the data sampling sequence of a current iteration includes: selecting 1110 a current iteration scan-set of stored items from a group of stored items, the selecting based at least partially on a current iteration sampling allotment; when a scanning-condition is met 1204 then in response scanning 1112 data of the current iteration scan-set for sensitive data which meets a predefined sensitivity criterion which defines a sensitivity type; when scanned data of a particular stored item of the current iteration scan-set includes sensitive data which meets the predefined sensitivity criterion, then in response updating 1116 a data security classification statistical measure; calculating 1228 a next iteration sampling allotment which is based at least partially on the current iteration sampling allotment and the data security classification statistical measure; and when the iterations-complete-condition is not met, then in response using 1230 the next iteration sampling allotment as the current iteration sampling allotment of a next iteration of the data sampling sequence.

In some embodiments, the method further includes choosing 1214 to scan data for different sensitivity types at different times during the method, and the choosing is based on at least one of the following: which sensitivity type or combination of sensitivity types have been found by previous scanning, metadata of the group of stored items, the data security classification statistical measure, an iteration number which indicates how many iterations of the data sampling sequence have been performed, or a computational cost that is associated with scanning for a particular sensitivity type.

In some embodiments, the iterations-complete-condition includes at least one of the following: an iteration count, or a specified stability of the data security classification statistical measure.

In some embodiments, the method further includes labeling 1114 sensitive data with at least one predefined sensitivity label which corresponds to the predefined sensitivity criterion satisfied by the sensitive data.

In some embodiments, the data security classification statistical measure 422 includes at least one of the following: a sensitivity-presence value 702 which measures stored items which have been labeled during iterations performed so far, relative to a measure of all stored items of the group; a sensitivity-diversity value 704 which measures an amount of sensitivity types of stored items which have been labeled during iterations performed so far, relative to a measure of all defined sensitivity types.

Additional Examples and Observations

One of skill will recognize that not every part of this disclosure, or any particular details therein, are necessarily required to satisfy legal criteria such as enablement, written description, or best mode. Also, embodiments are not limited to the particular networks, tools, identifiers, fields, data structures, functions, constants, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some teachings herein promote efficient and effective storage sampling for data sensitivity. As a motivating example, consider a smart sampling algorithm for hierarchical blob storage (composed of containers and blobs), which aims to discover as much sensitive information as possible when given a budget 424 on the number of blobs to scan. This algorithm works in iterations. In each iteration, it samples containers 420, scans blobs 418, and collects containers' data sensitivity-related statistics 422. Based on these statistics 422, the algorithm decides how to use the sampling budget in the next iteration 414. For example, the algorithm computes the fraction of sensitive blobs in each container, which is a statistic 702 that approximates how likely it is that a container contains sensitive data 212. In the next iteration 414, the algorithm partitions 1230 the budget between containers according to the probability of finding sensitive data in each container. The algorithm combines multiple considerations in its decision, e.g., increasing the amount of sensitive data discovered, the diversity of the sensitive data types, and more.

One model for illustrating this algorithm includes an environment 202 with the following: a storage hierarchy of accounts, containers, blobs; a few (less than fifty, often less than ten) predefined sensitive data types, e.g., credit card numbers, cryptographic keys; a scanner algorithm which scans a blob and identifies the existence of sensitive data types; a scanner for each sensitive data type; a predefined hierarchy of sensitivity labels, e.g., highly confidential GDPR, highly confidential, confidential GDPR, confidential, public, general. In this model, each blob may contain sensitive data of different types.

This model (and thus embodiments according to this model) also includes a policy (which may be per tenant) that defines a many-to-one mapping between sensitivity data types and a sensitivity label. Each label is defined by a set of sensitivity data types. These sets are disjoint, i.e., a data type cannot be mapped to more than one label. For example, a confidential label may be defined by credit card and key data types. In this model, a container is labeled according to the data types that exist in its blobs, receiving the highest applicable label in the hierarchy.

Real world installations represented by this model pose technical challenges which teachings herein help reduce or overcome. Given a storage hierarchy composed of accounts, containers, and blobs, one challenge is how to efficiently traverse the hierarchy, scan the blobs, and label containers accurately according to the data types of the data they hold. It is assumed one cannot scan all blobs, due to time or cost considerations. Accordingly, one may be given a budget such as the maximum number of blobs to scan. This leads to a challenge of designing a traversal algorithm which selects blobs such that an objective function is maximized.

Several objective functions may be of interest in a given installation.

One objective function measures how well the sampling traversal algorithm maximizes the fraction of sensitive blobs identified. A recall-sensitivity function of a container (or other stored item group) is defined as the number of sensitive stored items identified in the container divided by the number of stored items that exist in the container.

Another objective function measures how well the sampling traversal algorithm maximizes the diversity of data types identified. A recall-diversity function of a container (or other stored item group) is defined as the number of distinct sensitive data types identified in stored items of the container divided by the number of distinct sensitive data types that exist in the container.

Another objective function measures how well the sampling traversal algorithm accurately labels containers. A labeling-error function of a container (or other stored item group) is defined as the absolute value of the difference between a container's accurate label's weight and the weight of the label assigned to the container by the algorithm, divided by one plus the greatest label weight defined. In this calculation, no label (or a label denoting no heightened sensitivity data) is denoted 0 and given weight 0, the rest of the labels are denoted from 1 to n and given that respective weight, where 1 is assigned to the lowest label in the hierarchy and n is assigned to the highest label in the hierarchy.

An effectiveness measurement of a traversal algorithm can be based on one or more of these objective functions 426. For example, an algorithm's effectiveness may be measured by averaging the desired objective function(s) metric(s) over all containers of interest, e.g., all containers in the specified data environment 202.

As further illustration of traversal algorithms suitable for data sensitivity sampling, pseudocode is presented below. This algorithm runs in iterations 414. In each iteration, for each container (containers are examples of groups 420, in this example algorithm), the algorithm randomly selects 1110 some number of blobs (examples of store items 418) and computes the container's statistics 422. The statistics 422 are based on the blobs scanned so far and example statistic definitions are given in the pseudocode below.

In this pseudocode, Psens-i-j (an example of sensitivity-presence 702) represents the fraction of sensitive blobs found in the container so far. Ndtypes-i-j (an example of sensitivity-diversity 704) represents a normalized number of new data types 404 found in the container in this iteration. As an aside, the primary notation used here places the index variables i and j on the normal line of type, for typographical convenience. However, subscripts or superscripts or both could also be used, e.g., i may be positioned as a superscript appended to Psens and to Ndtypes, with j positioned as a subscript appended to Psens and to Ndtypes. A subscript and superscript notation is used in pseudocode below. Regardless of notational variations in the pseudocode, based on these statistics 422 and with some effect of randomness, the algorithm decides how many 514 blobs to sample from each container in the next iteration. The number of blobs to sample per container is an example of a sampling allotment 424 allocated 1230 to the container 420. A sampling allotment 424 formulation is detailed in the pseudocode below.

With the benefit of understanding from teachings provided herein, one of skill may recognize several challenges addressed by this algorithm and similar algorithms. "Similar algorithms" may use different notation than shown here, different groups 420, different stored items 418, different score-i-j calculations or other statistics 422 than the current algorithm, or different acts or omissions when sensitive data 212 is found by scanning, for example. Challenges addressed in this algorithm pseudocode and in some similar algorithms include how to sample a large number of blobs from containers with a high fraction of sensitive blobs (relatively large Psens-i-j), and how to sample a large number of blobs from containers for which the algorithm identifies a large number of new data types (relatively large Ndtypes-i-j), and how to sample containers sufficiently uniformly in order to add some randomness.

This pseudocode uses the following notations:
N: total number of blobs 418
b: total number of blobs to scan per iteration 414
m: number of containers 420
$b_j^i$: number of blobs to scan in container $C_j$ in iteration i (example allotment 424)
k: total number of iterations (example iterations-complete-condition 502)
t: number of predefined data types 404
$\alpha_1, \alpha_2$: score coefficients, where $0 \leq \alpha_1 + \alpha_2 \leq 1$ With the discussion above as context, here is the data sensitivity sampling traversal algorithm pseudocode:
Initialize allotments: $b_j^1 = b/m$, j=1, . . . , m
For each iteration i=1, . . . , k
  For each container $C_j$, j=1, . . . , m
  Select 1214 the scanners 430 to use based on some criteria 504
  Randomly select 1110 $b_j^i$ blobs from the container, scan 1112
them and if i<m compute 1116:

$$Psens_j^i = \frac{\text{number of sensitive blobs identified so far}}{\text{number of blobs in container}}$$

$$Ndtypes_j^i = \frac{\text{number of new data types identified in this iteration}}{\text{number of predefined data types}(t)}$$

$$score_j^i = \alpha_1\, Psens_j^i + \alpha_2\, Ndtypes_j^i + (1 - \alpha_1 - \alpha_2)\frac{1}{m}$$

$$b_j^{i+1} = \frac{score_j^i}{\sum_{j=1}^{m} score_j^i} b$$

As discussed in this document, the sampling traversal stopping criteria 502 could be k iterations, or another limit on resources or costs, such as time 508, power 512, computational cost 510, and so on, or a combination of such criteria. Stopping criteria 502 could also be based on scores-i-j stability 606, for example.

When the number of iterations to perform is a predefined number k, then various tradeoffs or factors or other considerations may go into determining the value of k. Using a smaller k (k=1 in the extreme) may increase the likelihood of harming result 1120 quality as the traversal algorithm has less opportunity to gradually adapt sampling choices 1110, 1214, 1230 to characteristics of each container and select the desired amount of samples from each. Using a larger k may increase the likelihood of sampling data 118 that has little or no impact on the statistics 422 and so harms result 1120 quality. This may also reduce efficiency because little is gained despite the additional computational costs incurred as the iterations communicate between containers and the algorithm code 410, update the state (scores) 422, etc. So a desirable balance is enough iterations 414 to get good quality results 1120 (e.g., as measured by statistic stability 606 or objective function maximization) while performing as few iterations as possible to obtain those results 1120.

As also discussed in this document, one may define criteria 504 for selecting the scanner(s) 430 to use in each iteration 414. Some examples of scanner selection criteria 504 include: the data types 404 found so far in the container or other group 420; the metadata 432 of the container or other group 420 such as size, name, modification date, or a combination thereof; the container's Psens-i-j or Ndtypes-i-j or score-i-j of the previous iteration; the iteration number; the scanner's computational activation cost; or other criteria.

Score-i-j is expected to capture the likelihood to find additional sensitive information in the next iteration based on the information gathered so far. Accordingly, the value of score-i-j is expected to stabilize as the number of iterations increases. B-i-j (the number of blobs to scan) is proportional to score-i-j, so b-i-j is also expected to stabilize as iterations increase.

One of skill will note the use of ratios (fractions) in the formulas. It may not be feasible to scan a non-integer number of blobs, but an embodiment may perform some truncation or rounding in the calculations to obtain an integer number of blobs to be selected 1110 and scanned 1112.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

Conclusion

In short, the teachings provided herein may be applied to computing systems in a cloud or elsewhere, and thereby enhance 1202 cybersecurity and data categorization efficiency by providing 1118 reliable statistics 422 about the number and location of sensitive data 212 of different categories 404, 406 in a specified environment 202. In some embodiments, data security classification functionality (e.g., functionality for the classification or categorization of data 118 for security purposes) computes data sensitivity statistics 422 computed while sampling code 410 iteratively 1104 samples a collection 1000 of blobs, files, or other stored items 418 that hold data. The stored items 418 may be divided into groups 420, e.g., containers or directories. Efficient sampling algorithms are described using prose, pseudocode, and flowcharts, for instance. Data sensitivity statistic gathering or updating 1108 based on the sampling activity ends when a specified threshold 502 has been reached 1106, e.g., a certain number 514 of items 418 have been sampled 110, 1112, a certain amount 516 of data 118 has been sampled, sampling has used a certain amount 510 of computational resources, or one or more of the sensitivity statistics 422 has stabilized 606 to a certain extent. The resulting statistics 422 about data sensitivity can be utilized 1232 for regulatory compliance 1234, corporate or other entity policy formulation 1236 or enforcement 1238, data protection 1242, forensic investigation 1244, risk management 808, evidence production 814, or another classification-dependent or classification-enhanced activity.

Embodiments are understood to also include or benefit from tested and appropriate security controls and privacy controls such as the General Data Protection Regulation (GDPR), e.g., it is understood that appropriate measures should be taken to help prevent misuse of computing systems through the injection or activation of malware, unauthorized data exfiltration, or tampering with sensitive data 212 in the environment 202. Use of the tools and techniques taught herein is compatible with use of such controls.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 11 and 12 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, assembled differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system to improve power management in a computer network, comprising:
   a memory;
   a processor which is in operable communication with the memory, the processor configured to configure the memory with instructions and data and perform steps which include providing data security classification statistics by (a) getting an iterations-complete-condition, and (b) iteratively repeating a data sampling sequence until the iterations-complete-condition is met, wherein the data sampling sequence of a current iteration includes (b1) selecting a current iteration scan-set of stored items from a group of stored items in the computer network, the selecting based at least partially on a current iteration power consumption budget representing an amount of electric power consumption in the computer network, (b2) when a scanning-condition is met then in response scanning data of the current iteration scan-set for sensitive data which meets a predefined sensitivity criterion which defines a sensitivity type, (b3) when scanned data of a particular stored item of the current iteration scan-set includes sensitive data which meets the predefined sensitivity criterion, then in response labeling the particular stored item with a predefined sensitivity label which corresponds to the predefined sensitivity criterion, and when the scanned data of a particular stored item does not include data which meets the predefined sensitivity criterion, then in response avoiding labeling the particular stored item with the predefined sensitivity label, (b4) updating a data security classification statistical measure in response to the labeling or the avoiding labeling, (b5) calculating a next iteration power consumption budget which is based at least partially on the current iteration power consumption budget and the data security classification statistical measure, and (b6) when the iterations-complete-condition is not met, then in response using the next iteration power consumption budget as the current iteration power consumption budget of a next iteration of the data sampling sequence;
   whereby the system manages power consumption in the computer network during data security classification by selectively limiting which stored items are scanned for data that meets the predefined sensitivity criterion instead of scanning all stored items.

2. The system of claim 1, wherein the system comprises multiple data scanners which are configured to perform scanning for sensitive data which meets a respective predefined sensitivity criterion, and wherein the processor is configured to set the scanning-condition to enable zero or more scanners for a particular iteration based on at least one of the following: which sensitivity type or combination of sensitivity types have been found by previous scanning, metadata of the group of stored items, the data security classification statistical measure, an iteration number which indicates how many iterations of the data sampling sequence have been performed, or a computational cost that is associated with a particular scanner.

3. The system of claim 1, wherein the current iteration power consumption budget for a first iteration is based on at least one of the following: an amount of time, an amount of a computational resource, an amount of power consumption, a number of stored items, or an amount of stored item data.

4. The system of claim 1, wherein the iterations-complete-condition comprises at least one of the following: a maximum number of iterations, a minimum number of iterations, a maximum time expended during iterations, a minimum time expended during iterations, a maximum computational resource used during iterations, a minimum computational resource used during iterations, a maximum power consumption during iterations, a minimum power consumption during iterations, a maximum number of stored items scanned during iterations, a minimum number of stored items scanned during iterations, a maximum number of stored items labeled during iterations, a minimum number of stored items labeled during iterations, a maximum amount of data scanned during iterations, a minimum amount of data scanned during iterations, or a specified stability of the data security classification statistical measure during iterations.

5. The system of claim 1, wherein the current iteration scan-set includes stored items from a plurality of groups of stored items, and a portion of the current iteration power consumption budget is allocated to each of the groups.

6. The system of claim 1, wherein the data security classification statistical measure comprises at least one of the following:
a sensitivity-presence value which measures stored items which have been labeled during iterations performed so far, relative to a measure of all stored items of the group;
a sensitivity-diversity value which measures an amount of sensitivity types of stored items which have been labeled during iterations performed so far, relative to a measure of all defined sensitivity types.

7. A method to improve power management in a computer network, comprising performing programmed operations as follows:
allocating an initial power consumption budget among m groups of stored data items in the computer network, m being an integer greater than one, the power consumption budget representing an amount of electric power consumption in the computer network;
for each iteration i until an iterations-complete-condition is met:
for each group group-j of stored data items, j ranging from one to m:
selecting a scan-set scan-set-i-j of stored items from within group group-j, the selecting based at least partially on a power consumption budget allotment-i-j which is based at least partially on a data security classification statistical measure score-i-j, wherein score-i-j is based at least partially on sensitive data identified so far by scanning data of stored items;
when a scanning-condition is met then in response scanning data of the scan-set scan-set-i-j of stored items for sensitive data, wherein sensitive data is data that meets a predefined sensitivity criterion which defines a sensitivity type;
when a scanned particular stored item of the current iteration scan-set includes sensitive data, then in response updating score-i-j;
and
providing a data sensitivity result to at least one of the following: a data privacy tool, a data security tool, a data loss prevention tool, a risk management tool, a regulatory compliance tool, a forensics tool, computational resource administration tool, or a litigation evidence production tool.

8. The method of claim 7, wherein providing data sensitivity results comprises providing at least one of the following:
each score-i-j;
a per-group data security classification statistical measure score-j which is based on score-i-j values for group-j over multiple iterations;
a per-group sensitivity-presence value sensitivity-presence-j which measures sensitive data identified in group group-j relative to a measure of all data of group-j;
a per-group sensitivity-diversity value sensitivity-diversity-j which measures an amount of sensitivity types of data identified in group group-j relative to a measure of all defined sensitivity types;
an overall data security classification statistical measure score which is based on score-i-j values for all groups over all iterations;
an overall sensitivity-presence value which measures sensitive data identified in all groups over all iterations relative to a measure of all data in all groups; or
an overall sensitivity-diversity value which measures an amount of sensitivity types of data identified in all groups over all iterations relative to a measure of all defined sensitivity types.

9. The method of claim 7, further comprising at least one of the following:
choosing on a per-group basis which zero or more sensitivity types to scan data for in a particular group-j;
choosing on a per-iteration basis which zero or more sensitivity types to scan data for during a particular iteration i; or
scanning data for different sensitivity types at different times during the method.

10. The method of claim 7, further comprising labeling sensitive data during the operations with at least one predefined sensitivity label which corresponds to the predefined sensitivity criterion satisfied by the sensitive data, after the sensitive data is identified during the operations.

11. The method of claim 7, wherein the method comprises meeting the iterations-complete-condition by discerning a specified level of stability of the data security classification statistical measure over at least two iterations.

12. The method of claim 7, wherein:
selecting a scan-set of stored items includes selecting at least one of the following stored items: blobs, files, tables, records, objects, email messages, email attachments; and
selecting a scan-set of stored items from within a group includes selecting stored items from within at least one of the following stored item groups: a container, a directory, a database, a list, a tree, an account, a repository.

13. The method of claim 7, wherein the method comprises operations which maximize at least one of the following objective functions:
a sensitive-items-recall objective function which computes at least: a value based on a number of stored items in a group which have been identified as containing sensitive data divided by a value based on a number of stored items in the group which actually contain sensitive data;
a sensitivity-types-recall objective function which computes at least: a value based on a number of distinct sensitivity types of stored items in a group which have been identified as containing sensitive data divided by a value based on a number of distinct sensitivity types of stored items in the group which actually contain sensitive data; or
a labeling-error objective function which computes at least a difference between a numeric weight of a most sensitive identified sensitivity type of stored items in a group and a numeric weight of an actual most sensitive sensitivity type of stored items in the group.

14. The method of claim 7, wherein scanning data of stored items for sensitive data comprises scanning for at least one of the following: personal or protected health information, personal or commercial financial information, personally identifiable information, biometric data, genetic data, racial data, ethnic data, data describing a religious affiliation or belief, data describing a political affiliation or opinion, online identity, data describing a sexual orientation or preference, marital status, personal or family relationship data, trade secret data, or confidential commercial information.

15. The method of claim 7, wherein scanning data of stored items for sensitive data comprises scanning for sensitive data which meets the predefined sensitivity criterion defining at least one of the following sensitivity types: public, non-public, private, restricted, confidential, highly confidential, secret, top secret, low, medium, high, non-classified, classified, non-regulated, regulated, subject to a specific regulation or a specific law.

16. A computer-readable storage medium configured with data and programmed instructions which upon execution by a processor perform a method to improve power management in a computer network, the method comprising providing data sensitivity results computed by:
repeating iterations of a data sampling sequence until an iterations-complete-condition is met, wherein the data sampling sequence of a current iteration includes:
selecting a current iteration scan-set of stored items from a group of stored items in the computer network, the selecting based at least partially on a current iteration power consumption budget, the power consumption budget representing an amount of electric power consumption in the computer network;
when a scanning-condition is met then in response scanning data of the current iteration scan-set for sensitive data which meets a predefined sensitivity criterion which defines a sensitivity type;
when scanned data of a particular stored item of the current iteration scan-set includes sensitive data which meets the predefined sensitivity criterion, then in response updating a data security classification statistical measure;
calculating a next iteration power consumption budget which is based at least partially on the current iteration power consumption budget and the data security classification statistical measure; and
when the iterations-complete-condition is not met, then in response using the next iteration power consumption budget as the current iteration power consumption budget of a next iteration of the data sampling sequence.

17. The storage medium of claim 16, wherein the method further comprises choosing to scan data for different sensitivity types at different times during the method, and wherein the choosing is based on at least one of the following: which sensitivity type or combination of sensitivity types have been found by previous scanning, metadata of the group of stored items, the data security classification statistical measure, an iteration number which indicates how many iterations of the data sampling sequence have been performed, or a computational cost that is associated with scanning for a particular sensitivity type.

18. The storage medium of claim 16, wherein the iterations-complete-condition comprises at least one of the following: an iteration count, or a specified stability of the data security classification statistical measure.

19. The storage medium of claim 16, wherein the method further comprises labeling sensitive data with at least one predefined sensitivity label which corresponds to the predefined sensitivity criterion satisfied by the sensitive data.

20. The storage medium of claim 19, wherein the data security classification statistical measure comprises at least one of the following:
a sensitivity-presence value which measures stored items which have been labeled during iterations performed so far, relative to a measure of all stored items of the group;
a sensitivity-diversity value which measures an amount of sensitivity types of stored items which have been labeled during iterations performed so far, relative to a measure of all defined sensitivity types.

* * * * *